US010474841B2

(12) United States Patent
Adams et al.

(10) Patent No.: US 10,474,841 B2
(45) Date of Patent: Nov. 12, 2019

(54) SYSTEM AND METHOD OF OWNER APPLICATION CONTROL OF ELECTRONIC DEVICES

(71) Applicant: BlackBerry Limited, Waterloo (CA)

(72) Inventors: Neil Patrick Adams, Waterloo (CA); Michael Grant Kirkup, Waterloo (CA); Herbert Anthony Little, Waterloo (CA); Russell Norman Owen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 100 days.

(21) Appl. No.: 15/402,007

(22) Filed: Jan. 9, 2017

(65) Prior Publication Data

US 2017/0124344 A1 May 4, 2017

Related U.S. Application Data

(63) Continuation of application No. 14/715,227, filed on May 18, 2015, now Pat. No. 9,542,571, which is a (Continued)

(51) Int. Cl.

*G06F 21/00* (2013.01)
*G06F 21/62* (2013.01)
(Continued)

(52) U.S. Cl.

CPC .............. *G06F 21/629* (2013.01); *G06F 8/61* (2013.01); *G06F 12/1458* (2013.01);
(Continued)

(58) Field of Classification Search

CPC ...... G06F 21/629; G06F 8/61; G06F 12/1458; G06F 21/51; G06F 21/52; G06F 21/53
(Continued)

(56) References Cited

U.S. PATENT DOCUMENTS 5,560,008 A 9/1996 Johnson et al.
5,619,710 A 4/1997 Travis, Jr. et al.
(Continued)

FOREIGN PATENT DOCUMENTS

AU 2003201905 A1 7/2003
EP 0384610 A2 8/1990
(Continued)

OTHER PUBLICATIONS

Notice of Allowance dated Aug. 11, 2010; U.S. Appl. No. 12/468,441, filed May 19, 2009; 12 pages.
(Continued)

*Primary Examiner* — Daniel A Hess
(74) *Attorney, Agent, or Firm* — Conley Rose, P.C.; J. Robert Brown, Jr.; Robert E. Kent

(57) ABSTRACT

Systems and methods of owner application control of an electronic device are provided. Owner application control information is stored on the electronic device and/or one or more remote servers. Owner application control information is consulted to determine if one or more required applications are available for execution on the electronic device. If not, one or more required applications not available are downloaded and installed. This could be in a manner transparent to the user of the electronic device. If one or more required applications are not available on the electronic device, the device can be functionally disabled in whole, or in part, until one or more required applications are available.

20 Claims, 9 Drawing Sheets

Related U.S. Application Data continuation of application No. 13/618,311, filed on Sep. 14, 2012, now Pat. No. 9,033,216, which is a continuation of application No. 12/885,281, filed on Sep. 17, 2010, now Pat. No. 8,887,988, which is a continuation of application No. 11/118,844, filed on Apr. 29, 2005, now Pat. No. 7,815,100, which is a continuation-in-part of application No. 13/606,814, filed on Sep. 7, 2012, now abandoned, which is a continuation of application No. 12/869,589, filed on Aug. 26, 2010, now Pat. No. 8,302,185, which is a continuation of application No. 10/732,132, filed on Dec. 10, 2003, now Pat. No. 7,793,355.

(60) Provisional application No. 60/567,163, filed on Apr. 30, 2004, provisional application No. 60/432,610, filed on Dec. 12, 2002.

(51) Int. Cl.

| | |
|---|---|
| ***G06F 12/14*** | (2006.01) |
| ***G06F 21/51*** | (2013.01) |
| ***G06F 21/52*** | (2013.01) |
| ***G06F 21/53*** | (2013.01) |
| ***G06F 21/71*** | (2013.01) |
| ***H04M 1/725*** | (2006.01) |
| ***H04L 29/08*** | (2006.01) |
| ***G06F 8/61*** | (2018.01) |
| *H04L 29/06* | (2006.01) |

(52) U.S. Cl.
CPC .............. *G06F 21/51* (2013.01); *G06F 21/52* (2013.01); *G06F 21/53* (2013.01); *G06F 21/6218* (2013.01); *G06F 21/71* (2013.01); *H04L 67/34* (2013.01); *H04M 1/72525* (2013.01); *G06F 2221/2149* (2013.01); *H04L 63/102* (2013.01)

(58) Field of Classification Search
USPC .............................. 235/375; 705/51; 717/168
See application file for complete search history.

(56) References Cited

U.S. PATENT DOCUMENTS

| | | | |
|---|---|---|---|
| 5,761,669 | A | 6/1998 | Montague et al. |
| 5,778,348 | A | 7/1998 | Manduley et al. |
| 5,784,552 | A | 7/1998 | Bishop et al. |
| 5,944,821 | A | 8/1999 | Angelo |
| 6,061,794 | A | 5/2000 | Angelo et al. |
| 6,101,607 | A | 8/2000 | Bachand et al. |
| 6,134,593 | A | 10/2000 | Alexander et al. |
| 6,134,659 | A | 10/2000 | Sprong et al. |
| 6,141,754 | A | 10/2000 | Choy |
| 6,167,521 | A | 12/2000 | Smith et al. |
| 6,169,976 | B1 * | 1/2001 | Colosso .................. G06F 21/10 705/51 |
| 6,192,476 | B1 | 2/2001 | Gong |
| 6,202,207 | B1 | 3/2001 | Donohue |
| 6,212,635 | B1 | 4/2001 | Reardon |
| 6,216,116 | B1 | 4/2001 | Barkan et al. |
| 6,233,608 | B1 | 5/2001 | Laursen et al. |
| 6,480,961 | B2 | 11/2002 | Rajasekharan et al. |
| 6,487,665 | B1 | 11/2002 | Andrew et al. |
| 6,513,121 | B1 | 1/2003 | Serkowski |
| 6,922,782 | B1 | 7/2005 | Spyker et al. |
| 6,931,379 | B1 | 8/2005 | Sato et al. |
| 7,546,956 | B2 | 6/2009 | Adams et al. |
| 7,793,355 | B2 | 9/2010 | Little et al. |
| 7,815,100 | B2 | 10/2010 | Adams et al. |
| 8,302,185 | B2 | 10/2012 | Little et al. |
| 8,429,410 | B2 | 4/2013 | Little et al. |
| 8,887,988 | B2 | 11/2014 | Adams et al. |
| 9,033,216 | B2 | 5/2015 | Adams et al. |
| 9,542,571 | B2 | 1/2017 | Adams et al. |
| 2001/0002485 | A1 | 5/2001 | Bisbee et al. |
| 2001/0032188 | A1 | 10/2001 | Miyabe et al. |
| 2002/0007454 | A1 | 1/2002 | Tarpenning et al. |
| 2002/0152376 | A1 | 10/2002 | Eigeles |
| 2003/0101292 | A1 | 5/2003 | Fisher et al. |
| 2003/0172034 | A1 | 9/2003 | Schneck et al. |
| 2003/0178482 | A1 | 9/2003 | Kisliakov |
| 2003/0191719 | A1 | 10/2003 | Ginter et al. |
| 2004/0039911 | A1 | 2/2004 | Oka et al. |
| 2004/0078565 | A1 | 4/2004 | Hofmeister et al. |
| 2004/0210760 | A1 | 10/2004 | McGrath et al. |
| 2005/0050319 | A1 | 3/2005 | Suraski |
| 2006/0272028 | A1 | 11/2006 | Maes |
| 2009/0224036 | A1 | 9/2009 | Adams et al. |
| 2013/0007877 | A1 | 1/2013 | Little et al. |

FOREIGN PATENT DOCUMENTS

| | | | |
|---|---|---|---|
| EP | 0828209 | A1 | 3/1998 |
| EP | 1168141 | A2 | 1/2002 |
| EP | 1263248 | A1 | 12/2002 |
| EP | 1185923 | B1 | 3/2004 |
| EP | 1427166 | A2 | 6/2004 |
| EP | 1465041 | A2 | 10/2004 |
| EP | 0813132 | B1 | 1/2005 |
| EP | 2429148 | A2 | 3/2012 |
| FR | 2825565 | A1 | 12/2002 |
| GB | 2312767 | A | 11/1997 |
| GB | 2355819 | A | 5/2001 |
| GB | 2378780 | A | 2/2003 |
| GB | 2333865 | B | 5/2003 |
| JP | 2002056360 | A | 2/2002 |
| JP | 2002091598 | A | 3/2002 |
| JP | 2002170063 | A | 6/2002 |
| JP | 2002182963 | A | 6/2002 |
| WO | 1998044404 | A1 | 10/1998 |
| WO | 0060434 | A1 | 10/2000 |
| WO | 0171590 | A1 | 9/2001 |
| WO | 2001077811 | A1 | 10/2001 |
| WO | 2002097620 | A2 | 12/2002 |
| WO | 2003058411 | A1 | 7/2003 |
| WO | 2003063524 | A1 | 7/2003 |
| WO | 2004053618 | A2 | 6/2004 |

OTHER PUBLICATIONS

Office Action dated Nov. 12, 2013; U.S. Appl. No. 12/885,281, filed Sep. 17, 2010; 32 pages.
Office Action dated Apr. 3, 2014; U.S. Appl. No. 12/885,281, filed Sep. 17, 2010; 9 pages.
Notice of Allowance dated Jul. 16, 2014; U.S. Appl. No. 12/885,281, filed Sep. 17, 2010; 12 pages.
Office Action dated Jan. 17, 2013; U.S. Appl. No. 13/618,311, filed Sep. 14, 2012; 17 pages.
Office Action dated Jun. 28, 2013; U.S. Appl. No. 13/618,311, filed Sep. 14, 2012; 10 pages.
Final Office Action dated Oct. 30, 2013; U.S. Appl. No. 13/618,311, filed Sep. 14, 2012; 9 pages.
Advisory Action dated Jan. 3, 2014; U.S. Appl. No. 13/618,311, filed Sep. 14, 2012; 3 pages.
Office Action dated Apr. 2, 2014; U.S. Appl. No. 13/618,311, filed Sep. 14, 2012; 9 pages.
Notice of Allowance dated Jul. 10, 2014; U.S. Appl. No. 13/618,311, filed Sep. 14, 2012; 20 pages.
Notice of Allowance dated Jan. 7, 2015; U.S. Appl. No. 13/618,311, filed Sep. 14, 2012; 9 pages.
Office Action dated Jul. 8, 2015; U.S. Appl. No. 14/715,227, filed May 18, 2015; 52 pages.
Final Office Action dated Nov. 10, 2015; U.S. Appl. No. 14/715,227, filed May 18, 2015; 10 pages.
Advisory Action dated Jan. 25, 2016; U.S. Appl. No. 14/715,227, filed May 18, 2015; 2 pages.
Office Action dated Apr. 27, 2016; U.S. Appl. No. 14/715,227, filed May 18, 2015; 15 pages.

(56) References Cited

OTHER PUBLICATIONS

Notice of Allowance dated Aug. 17, 2016; U.S. Appl. No. 14/715,227, filed May 18, 2015; 16 pages.
Notice of Allowance dated Oct. 23, 2013; U.S. Appl. No. 13/561,374, filed Jul. 30, 2012; 5 pages.
PCT International Search Report; Application No. PCT/CA2004/000250; dated Sep. 14, 2004; 3 pages.
PCT Written Opinion of the International Searching Authority; Application No. PCT/CA2004/000250; dated Sep. 14, 2004; 6 pages.
European Examination Report; Application No. 04712985.3; dated Dec. 22, 2006; 5 pages.
PCT International Search Report; Application No. PCT/CA2003/01944; dated Jul. 12, 2004; 6 pages.
Australian Office Action; Application No. 2003292922; dated May 10, 2007; 2 pages.
Brazilian Office Action; Application No. PI0317233-3; dated Sep. 1, 2016; 9 pages.
Canadian Office Action; Application No. 2,509,358; dated May 8, 2008; 2 pages.
Canadian Office Action; Application No. 2,509,358; dated Nov. 20, 2009; 2 pages.
Canadian Office Action; Application No. 2,509,358; dated Nov. 25, 2010; 2 pages.
Canadian Notice of Allowance; Application No. 2,509,358; dated Nov. 14, 2011; 1 page.
Chinese Office Action; Application No. 200380109662.2; dated Feb. 2, 2007; 7 pages.
Chinese Office Action; Application No. 200380109662.2; dated Jan. 18, 2008; 5 pages.
Chinese Office Action; Application No. 200380109662.2; dated Aug. 21, 2009; 6 pages.
European Examination Report; Application No. 03788723.9; dated Sep. 10, 2007; 7 pages.
European Summons to Attend Oral Proceedings; Application No. 03788723.9; Jun. 29, 2010; 11 pages.
Indian Office Action; Application No. 2481/DELNP/2005; dated Apr. 12, 2007; 2 pages.
Indian Office Action; Application No. 3101/DELNP/2008; dated Sep. 30, 2013; 1 page.
Japanese Office Action; Application No. 2004-557718; dated Feb. 10, 2009; 12 pages.
Japanese Office Action; Application No. 2004-557718; dated Mar. 9, 2010; 8 pages.
Korean Office Action; Application No. 10-2005-7010726; dated Sep. 29, 2006; 9 pages.
PCT International Search Report; Application No. PCT/CA2005/000650; dated Aug. 22, 2005; 3 pages.
PCT Written Opinion of the International Searching Authority; Application No. PCT/CA2005/000650; dated Aug. 22, 2005; 7 pages.
PCT International Search Report; Application No. PCT/CA2005/000653; dated Aug. 25, 2005; 5 pages.
PCT Written Opinion of the International Searching Authority; Application No. PCT/CA2005/000653; dated Aug. 25, 2005; 7 pages.
Canadian Office Action; Application No. 2,564,186; dated Jun. 26, 2009; 2 pages.
Canadian Office Action; Application No. 2,564,186; dated Aug. 6, 2010; 2 pages.
Canadian Office Action; Application No. 2,564,186; dated Aug. 30, 2011; 2 pages.
Canadian Office Action; Application No. 2,564,186; dated Oct. 18, 2012; 2 pages.
Canadian Office Action; Application No. 2,564,186; dated Feb. 11, 2014; 2 pages.
Canadian Office Action; Application No. 2,564,186; dated Mar. 17, 2015; 4 pages.
Canadian Office Action; Application No. 2,564,186; dated Feb. 29, 2016; 4 pages.
Canadian Office Action; Application No. 2,564,285; dated Feb. 13, 2009; 3 pages.
Canadian Office Action; Application No. 2,564,285; dated Aug. 4, 2011; 3 pages.
Brazilian Office Action; Application No. PI0317233-3; dated Jan. 30, 2017; 7 pages.
Canadian Office Action; Application No. 2,564,186; dated Jan. 30, 2017; 5 pages.
Takaragi; "Angou Houshiki to Ouyou [Encryption system and Application]"; Journal of Information Processing; vol. 32, No. 6; Japan: Information Processing Society of Japan; Jun. 1991; 11 pages. (as referenced in Japanese Office Action dated Feb. 10, 2009 for Application No. 2004-557718).
Bos, Bert; "Re: CSS: Extended Tiling. Proposal"; www-style@w3.org, http://lists.w3.org/Archives/Public/www-style/2004May/0020.html; May 5, 2004; 2 pages.
W3C; "CSS3 Module: Border"; http://www.w3.org/TR/2002/WD-css3-border-20021107/ Nov. 7, 2002; 14 pages.
W3C; "CSS3 Backgrounds and Borders Module"; www.w3.org/TR/2005/WD-css3-background-20050216/; Feb. 16, 2005; 30 pages.
Samarati, Pierangela, et al.; "Access Control: Policies, Models, and Mechanisms"; Foundations of Security Analysis and Design; Lecture Notes in Computer Science vol. 2171; 2001; 60 pages.
Microsoft; "Managing Authorization and Access Control"; http://technet.microsoft.com/en-us/library/bb457115.aspx; Nov. 3, 2005; 84 pages.
Clarkson, Michael; "Access Control"; http://www.cs.cornell.edu/courses/cs513/2007fa/NL.accessControl.html; 2007; 8 pages.
Wikipedia; "Access Control List"; http://en.wikipedia.org/wiki/Access_control_list; retrieved Jul. 2, 2013; 3 pages.
Wikipedia; "Access Control List"; http://en.wikipedia.org/wiki/Access_control_list; retrieved Jun. 5, 2013; 1 page.
Housley, R., et al.; "Internet X.509 Public Key Infrastructure Certificate and CRL Profile"; RFC 2459; Jan. 1999; 129 pages.
Office Action dated Aug. 21, 2007; U.S. Appl. No. 10/784,024, filed Feb. 20, 2004; 21 pages.
Office Action dated Jun. 11, 2007; U.S. Appl. No. 10/732,132, filed Dec. 10, 2003; 13 pages.
Office Action dated Feb. 22, 2008; U.S. Appl. No. 10/732,132, filed Dec. 10, 2003; 11 pages.
Final Office Action dated Sep. 23, 2008; U.S. Appl. No. 10/732,132, filed Dec. 10, 2003; 9 pages.
Advisory Action dated Dec. 8, 2008; U.S. Appl. No. 10/732,132, filed Dec. 10, 2003; 3 pages.
Office Action dated Apr. 2, 2009; U.S. Appl. No. 10/732,132, filed Dec. 10, 2003; 10 pages.
Final Office Action dated Oct. 28, 2009; U.S. Appl. No. 10/732,132, filed Dec. 10, 2003; 10 pages.
Advisory Action dated Jan. 19, 2010; U.S. Appl. No. 10/732,132, filed Dec. 10, 2003; 3 pages.
Notice of Allowance dated May 4, 2010; U.S. Appl. No. 10/732,132, filed Dec. 10, 2003; 7 pages.
Office Action dated Aug. 3, 2011; U.S. Appl. No. 12/869,589, filed Aug. 26, 2010; 20 pages.
Office Action dated Jan. 19, 2012; U.S. Appl. No. 12/869,589, filed Aug. 26, 2010; 11 pages.
Notice of Allowance dated Jun. 13, 2012; U.S. Appl. No. 12/869,589, filed Aug. 26, 2010; 9 pages.
Office Action dated Jun. 17, 2013; U.S. Appl. No. 13/606,814, filed Sep. 7, 2012; 19 pages.
Final Office Action dated Oct. 10, 2013; U.S. Appl. No. 13/606,814, filed Sep. 7, 2012; 6 pages.
Office Action dated May 29, 2008; U.S. Appl. No. 11/118,844, filed Apr. 29, 2005; 4 pages.
Office Action dated Mar. 10, 2009; U.S. Appl. No. 11/118,844, filed Apr. 29, 2005; 6 pages.
Office Action dated Aug. 20, 2009; U.S. Appl. No. 11/118,844, filed Apr. 29, 2005; 15 pages.
Notice of Allowance dated Feb. 23, 2010; U.S. Appl. No. 11/118,844, filed Apr. 29, 2005; 7 pages.
Notice of Allowance dated Jun. 10, 2010; U.S. Appl. No. 11/118,844, filed Apr. 29, 2005; 8 pages.

(56) References Cited

OTHER PUBLICATIONS

Office Action dated Apr. 7, 2008; U.S. Appl. No. 11/118,748, filed Apr. 29, 2005; 11 pages.
Final Office Action dated Oct. 27, 2008; U.S. Appl. No. 11/118,748, filed Apr. 29, 2005; 10 pages.
Notice of Allowance dated Feb. 9, 2009; U.S. Appl. No. 11/118,748, filed Apr. 29, 2005; 6 pages.
Office Action dated Mar. 22, 2010; U.S. Appl. No. 12/468,441, filed May 19, 2009; 12 pages.
Canadian Office Action; Application No. 2,564,285; dated Aug. 14, 2012; 3 pages.
European Search Report; Application No. 05739066.8; dated Jul. 23, 2007; 3 pages.
European Examination Report; Application No. 05739066.8; dated Dec. 17, 2007; 5 pages.
European Examination Report; Application No. 05739066.8; dated Feb. 17, 2010; 5 pages.
European Invitation Pursuant to Article 94(3) and Rule 71(1) EPC; Application No. 05739066.8; dated May 20, 2011; 4 pages.
European Summons to Attend Oral Proceedings; Application No. 05739066.8; dated Oct. 30, 2015; 6 pages.
European Intention to Grant; Application No. 05739066.8; dated Jul. 6, 2016; 70 pages.
European Search Report; Application No. 05741262.9; dated Sep. 26, 2007; 11 pages.
European Examination Report; Application No. 05741262.9; dated Feb. 20, 2008; 4 pages.
European Examination Report; Application No. 05741262.9; dated Feb. 18, 2009; 5 pages.
European Examination Report; Application No. 05741262.9; dated May 3, 2010; 9 pages.
European Examination Report; Application No. 05741262.9; dated Apr. 25, 2016; 3 pages.
Canadian Office Action; Application No. 2,564,186; dated Jan. 16, 2018; 4 pages.
Brazilian Office Action; Application No. PI0317233-3; dated Jan. 18, 2019; 24 pages.

* cited by examiner

| Application | Version | Disposition | Delivery Mechanism | Policy Set |
|---|---|---|---|---|
| System Software | <Use Latest> | Required | Wireline Only | N/A |
| Browser | <System Version> | Required | Wireline Only | N/A |
| SSL/TLS Security Package | <System Version> | Required | Wireline Only | N/A |
| WTLS Security Package | <System Version> | Required | Wireline Only | N/A |
| Phone | <System Version> | Required | Wireline Only | N/A |
| MemoPad | <System Version> | Optional | Wireline Only | N/A |
| 950/957 | <System Version> | Optional | Wireline Only | N/A |
| 6200 Series | <System Version> | Optional | Wireline Only | N/A |
| 6700 Series | <System Version> | Optional | Wireline Only | N/A |
| 7200 Series | <System Version> | Optional | Wireline Only | N/A |
| 7700 Series | <System Version> | Optional | Wireline Only | N/A |
| Tasks | <System Version> | Optional | Wireline Only | N/A |
| 6200 Series | <System Version> | Optional | Wireline Only | N/A |
| 6700 Series | <System Version> | Optional | Wireline Only | N/A |
| 7200 Series | <System Version> | Optional | Wireline Only | N/A |
| 7700 Series | <System Version> | Optional | Wireline Only | N/A |
| Calender and Tasks | <System Version> | Optional | Wireline Only | N/A |
| 950/957 | <System Version> | Optional | Wireless Only | N/A |
| Internal MDS App | 1.0 | Required | Wireless | Internal App Policies |
| RIMCell | <Any> | Optional | Wireless | External App Policies |
| RIMZee | <Any> | Optional | Wireless | External App Policies |

SYSTEM AND METHOD OF OWNER APPLICATION CONTROL OF ELECTRONIC DEVICES

CROSS-REFERENCE TO RELATED APPLICATIONS

This application is a continuation of U.S. patent application Ser. No. 14/715,227 filed May 18, 2015 by Neil P. Adams, et al. entitled "System and Method of Owner Application Control of Electronic Devices", which is a continuation of U.S. Pat. No. 9,033,216 issued on May 19, 2015 entitled "System and Method of Owner Application Control of Electronic Devices", which is a continuation of U.S. Pat. No. 8,887,988 issued on Nov. 18, 2014 entitled "System and Method of Owner Application Control of Electronic Devices", which is a continuation of U.S. Pat. No. 7,815,100 issued on Oct. 19, 2010 entitled "System and Method of Owner Application Control of Electronic Devices", which claims priority to and the benefit of U.S. Provisional Application No. 60/567,163 filed Apr. 30, 2004 entitled "System and Method of Owner Application Control of Electronic Devices"; U.S. patent application Ser. No. 14/715,227 is also a continuation in part of U.S. patent application Ser. No. 13/606,814 filed Sep. 7, 2012 by Herbert A. Little, et al. entitled "System and Method of Owner Control of Electronic Devices", which is a continuation of U.S. Pat. No. 8,302,185 issued on Oct. 30, 2012 entitled "System and Method of Owner Control of Electronic Devices", which is a continuation of U.S. Pat. No. 7,793,355 issued on Sep. 7, 2010 entitled "System and Method of Owner Control of Electronic Devices", which claims priority to and the benefit of U.S. Provisional Application No. 60/432,610 filed Dec. 12, 2002 entitled "System and Method of Owner Control of Electronic Devices", all of which are incorporated herein by reference as if reproduced in their entirety.

BACKGROUND

This system relates generally to electronic devices, and in particular to controlling application installation of such devices by a device owner.

In a corporate environment, employees are often provided with access to office supplies and equipment to be used in performing job functions. Standard equipment typically includes at least a personal computer (PC), and may also include wireless mobile communication devices and other types of electronic devices. Although such equipment is intended primarily for business or work-related purposes, users sometimes make personal use of office equipment. Employers may be comfortable with some degree of personal use of such equipment, provided that the personal use does not interfere with normal job functions, does not incur additional costs, and conforms with company policies.

In these types of situations, a user of an electronic device is not the owner of the device, and the user and owner may have different perceptions of acceptable device uses. Acceptable uses may be specified in company policies, for example, which employees are expected to follow, but beyond company policy statements, a corporate device owner often has little if any control over how electronic devices are ultimately used. According to one known scheme for controlling operation of electronic devices, an owner loads a policy file onto a device to restrict the type of operations or software applications that may be executed by the device. However, this type of scheme is sometimes circumvented by a user by either deleting the owner policy file or replacing the owner policy file with a user policy file which may include fewer restrictions than the owner policy file. Therefore, there remains a need for a system and method of owner application control of electronic devices.

BRIEF DESCRIPTION OF THE DRAWINGS

FIG. 9 depicts an exemplary user interface on a remote server for an owner to designate application control information for dissemination to particular devices, or groups of devices.

DETAILED DESCRIPTION

Figure 1:
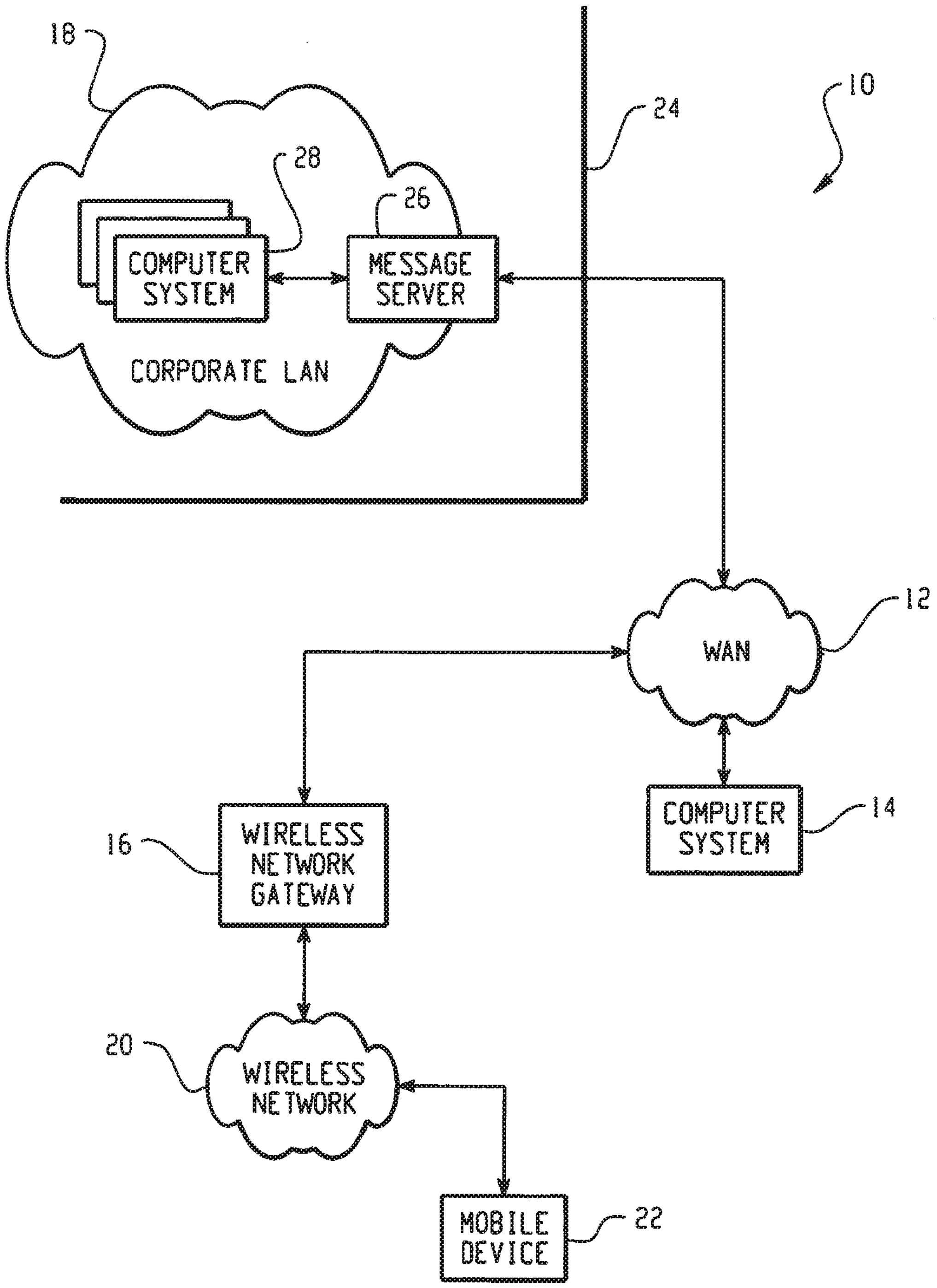
FIG. 1 is a block diagram showing a communication system in which electronic devices are used.

FIG. 1 is a block diagram showing a communication system in which electronic devices are used. The communication system 10 includes a Wide Area Network (WAN) 12, coupled to a computer system 14, a wireless network gateway 16 and a Local Area Network (LAN) 18. The wireless network gateway 16 is also connected to a wireless communication network 20 in which a wireless mobile communication device 22 ("mobile device"), is configured to operate.

The computer system 14 is a desktop or laptop PC, which is configured to communicate to the WAN 12, the Internet for example. PCs, such as the computer system 14, normally access the Internet through an Internet Service Provider (ISP), Application Service Provider (ASP) or the like.

The LAN 18 is an example of a typical working environment, in which multiple computers 28 are connected in a network. It is normally located behind a security firewall 24. Within the LAN 18, a message server 26, operating on a computer behind the firewall 24, acts as the primary interface for the corporation to exchange messages both within the LAN 18, and with other external messaging clients via the WAN 12. Known message servers include, for example, Microsoft™ Exchange Server and Lotus Domino™. The LAN 18 includes multiple computer systems 28, each of which implements a messaging client, such as Microsoft Outlook14, Lotus Notes™, Yahoo!™ Messenger, AOL Instant Messenger, or other client-server or peer-to-peer, or similar messaging clients with various architectures. Messages received by the message server 26 are distributed to mailboxes for user accounts addressed in the received messages, and are then accessed by a user through a messaging client operating on a computer system 28. The fact that the example given illustrates a client-server architecture in no way implies that such architecture is necessary, as other architectures may be used.

Although only a message server 26 is shown in the LAN 18, those skilled in the art will appreciate that a LAN may include other types of servers supporting resources that are shared between the networked computer systems 28, and that the message server 26 may also provide additional functionality, such as dynamic database storage for data such as, but not limited to, calendars, to-do lists, task lists, e-mail and documentation. The message server 26 and electronic messaging are described for illustrative purposes only. Owner control systems and methods are applicable to a wide range of electronic devices, and are in no way limited to electronic devices with messaging capabilities.

The wireless gateway 16 provides an interface to a wireless network 20, through which messages may be exchanged with a mobile device 22. Such functions as addressing of the mobile device 22, encoding or otherwise transforming messages for wireless transmission, and any other interface functions are performed by the wireless gateway 16. The wireless gateway 16 may be configured to operate with more than one wireless network 20, in which case the wireless gateway 16 also determines a most likely network for locating a given mobile device 22 and possibly track mobile devices as users roam between countries or networks.

The mobile device 22 is, for example, a data communication device, a voice communication device, a dual-mode communication device such as many modern cellular telephones having both data and voice communications functionality, a multiple-mode device capable of voice, data and other types of communications, a personal digital assistant (PDA) enabled for wireless communications, or a laptop or desktop computer system with a wireless modem.

Any computer system with access to the WAN 12 may exchange messages with the mobile device 22 through the wireless network gateway 16. Alternatively, private wireless network gateways such as wireless Virtual Private Network (VPN) routers could be implemented to provide a private interface to a wireless network. A wireless VPN router implemented in the LAN 18 provides a private interface from the LAN 18 to one or more mobile devices such as 22 through the wireless network 20. A private interface to a mobile device 22 may also effectively be extended to entities outside the LAN 18 by providing a message forwarding, or redirection system that operates with the message server 26. Such a message redirection system is disclosed in U.S. Pat. No. 6,219,694, which is hereby incorporated into this application by reference. In this type of system, incoming messages received by the message server 26 and addressed to a user of a mobile device 22 are sent through the wireless network interface, either a wireless VPN router, the wireless gateway 16, or another interface, for example, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, may be sent to the mobile device 22.

A wireless network 20 normally delivers messages to and from communication devices such as the mobile device 22 via RF transmissions between base stations and devices. The wireless network 20 may, for example, be a data-centric wireless network, a voice-centric wireless network, or a dual-mode network that can support both voice and data communications over the same infrastructure. Recently developed networks include Code Division Multiple Access (CDMA) networks and General Packet Radio Service (GPRS) networks. So-called third-generation (3G) networks like Enhanced Data rates for Global Evolution (EDGE) and Universal Mobile Telecommunications Systems (UMTS) are currently under development. Older data-centric networks include, but are not limited to, the Mobitex™ Radio Network ("Mobitex"), and the DataTAC™ Radio Network ("DataTAC"). Voice-centric data networks such as Personal Communication System (PCS) networks, including Global System for Mobile Communications (GSM) and Time Division Multiple Access (TDMA) systems, have been available in North America and world-wide for several years.

In the system 10, a company that owns the LAN 18 may provide a computer system 28 and/or a mobile device 22 to an employee. When a computer system 28 issued to an employee is a laptop computer, for example, the computer system 28 may be used either within or outside the corporate LAN 18. When the computer system is operating within the LAN 18, non-local operations may be restricted by configuring permissions and restrictions for the computer system 28, a network account of the user, or both, in such a way that the permissions and restrictions are not configurable by the user. However, if a user is using a computer outside the LAN 18, by connecting the computer to the WAN 12 as shown at 14, for example, network-based controls in place at the LAN 18 can sometimes be bypassed.

In order to maintain control over an electronic device such as the computer system 28 or mobile device 22, an owner may establish local settings directly on the device. Such local settings control device operations, but only as long as the settings remain intact on the device. A common problem with this type of control mechanism is that local settings may be deleted, replaced, or otherwise altered by a user.

In some instances, the owner control information can include one or more applications lists. The application lists provide owner control of application installation and deletion on the electronic device. As an example, application lists can address different types of applications, such as but not limited to:

Required applications: These applications must be present on the device before the user may use the device; alternatively, one or more operations of the device can be disabled until such applications are available for execution on the device. This will allow the owner to install audit and remote administrative applications. The user can in some implementations be prevented from deleting these applications. This list may be small.

Allowable (or authorized) applications: These applications may or may not be present on a device. Thus the user is free to download these applications if they desire the functionality that the application provides. This list may be small.

Excluded applications: These applications may not be present on a device. Presumably an excluded application is a malicious application, or otherwise undesirable application. This list is potentially large.

With respect to allowed and/or required applications, even if the applications are required or allowed on the device, the owner may want to impose restriction on operations that such applications can perform. For instance, the owner may want to control functionality such as:

1) Is the application allowed to open network connections inside the firewall (e.g., via MDS)?

2) Is the application allowed to open network connections outside the firewall (e.g., via WAP, device TCP, SMS)?

3) Is the application allowed to open local connections (e.g., serial, IR, or USB connections)?

4) Is the application allowed to interact with other processes? Is the application allowed to access a Runtime Store or a Persistent Store?

5) Is the application allowed access to a telephone API (e.g., to make phone calls)?

Figure 2:
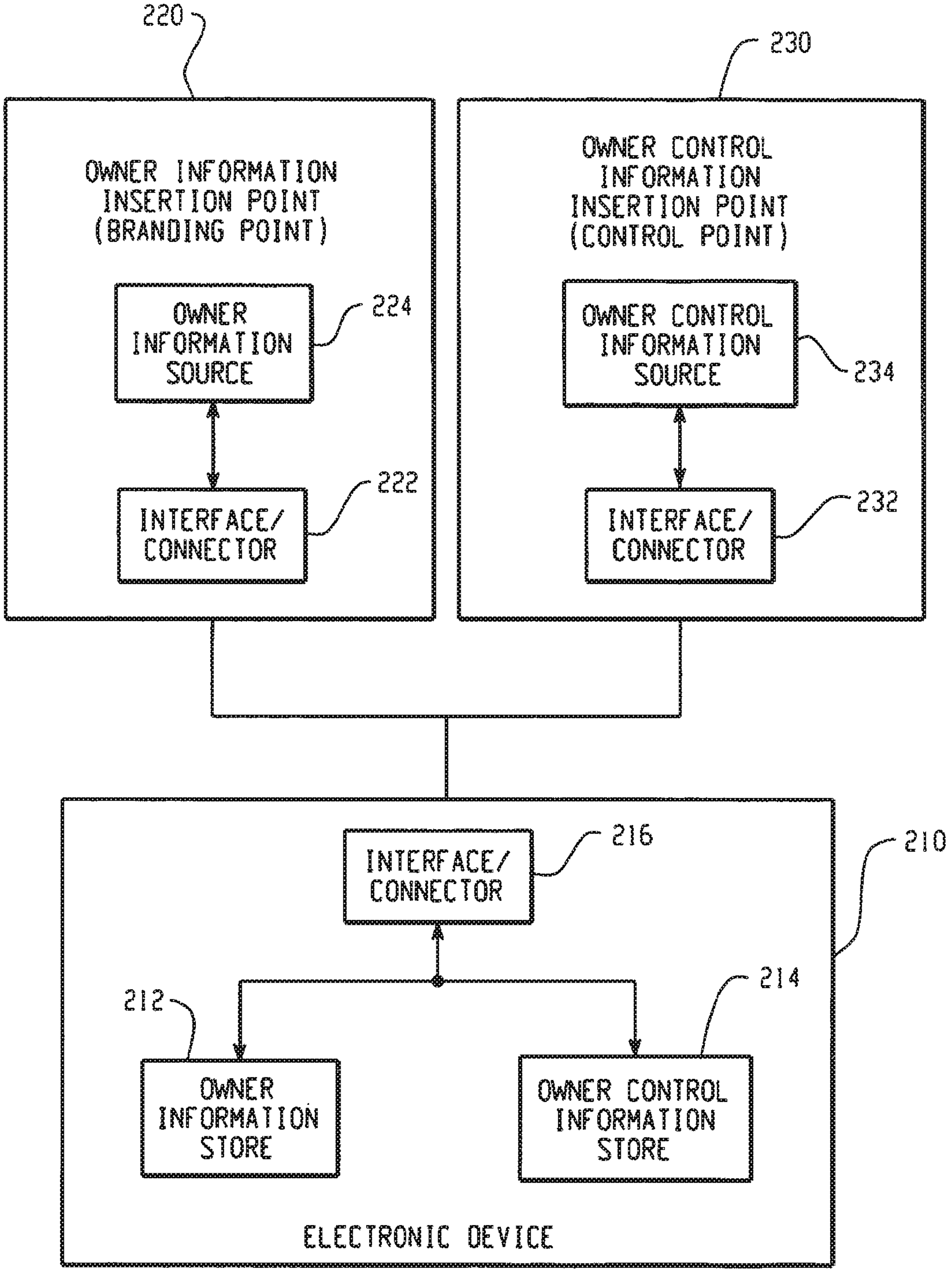
FIG. 2 is a block diagram illustrating a system of inserting owner information and owner control information onto an electronic device.

FIG. 2 is a block diagram illustrating a system of inserting owner information and owner control information onto an electronic device; such an insertion system may be used in one or more implementations of the described owner application control systems and methods. The foregoing explanation is therefore exemplary in nature. The system in FIG. 2 includes an electronic device 210, an owner information insertion point 220, and an owner control information insertion point 230. The owner information insertion point 220 is alternatively referred to as a branding point, while the owner control information insertion point 230 is alternatively referred to as a control point. An owner information store 212, an owner control information store 214, and an interface/connector 216 are provided in the electronic device 210. The owner information insertion point 220 includes an owner information source 224 and an interface/connector 222. The owner control information insertion point 230 similarly includes an owner control information source 234 and an interface/connector 232.

The owner information store 212 stores information, such as an owner name or other identification information, for example, which identifies an owner of the electronic device 210. The owner control information store 214 stores information that is used to control the operation of the electronic device 210. Owner control information may, for example, be specified in an authorization record that lists software applications authorized to be installed and executed on the electronic device 210; authorization records can further constrain operations performed by installed applications. The use of owner control information to control operations of an electronic device is described in further detail below. The owner information source 224 and the owner control information source 234 could be local memory devices, communication modules through which remote memory devices storing owner information and owner control information are accessible, or possibly user interfaces through which owner information and owner control information are entered.

The interface/connector 222 is compatible with the interface/connector 216 to establish a communication link between the owner information insertion point 220 and the electronic device 210, to thereby enable owner information to be transferred to the electronic device 210 from the owner information source 224. The interface/connector 232 similarly enables transfer of owner control information from the owner control information source 234 onto the electronic device 210 via a communication link established between the interface/connectors 232 and 216. The interface/connectors 216, 222, and 232 may establish wired communication links, where the interface/connectors are serial ports, for example, or wireless communication links such as infrared links where the interface/connectors are infrared modules. Owner information and owner control information transferred to a device are respectively inserted or stored in the owner information store 212 and the owner control information store 214.

The owner information insertion point 220 is associated with an owner of the electronic device 210. Where the electronic device 210 is provided to a user by an employer, for example, the owner information insertion point 220 may be a computer system or device controlled by a corporate computer system administrator or IT department. The electronic device 210 is "branded" with owner information by establishing a communication link between the owner information insertion point 220 and the electronic device 210 through the interface/connectors 222 and 216 and then inserting owner information into the owner information store 212. Unless otherwise desired, once owner information has been inserted onto the mobile device 210, then there can be a configuration such that only the owner or a party authorized by the owner is able to change the owner information or insert or change owner control information on the electronic device 210.

Because insertion of owner control information onto the electronic device 210 is restricted once owner information has been inserted, the owner control information insertion point 230 need not necessarily be controlled by the owner of the electronic device 210. When the owner maintains control over the owner control information insertion point 230, the insertion points 220 and 230 may be implemented in the same computer system or device and share the same interface/connector. However, separate insertion points 220 and 230 as shown in FIG. 2 allow an owner of the electronic device to delegate owner control information insertion to a trusted entity. If owner control information insertion is controlled using digital signatures, for example, as described in further detail below, an owner first brands the electronic device 210 and provides the electronic device 210 and digitally signed owner control information to a user. In this case, the owner control information insertion point 230 may be the user's computer system, which is then used to insert the digitally signed owner control information onto the electronic device 210.

In most implementations, the owner information insertion point 220 and the owner control information control point 230 include the same type of interface/connectors 222 and 232, compatible with the interface/connector 216 in the electronic device 210. However, the electronic device 210 may alternatively include multiple interface/connectors, such that different types of interface/connectors may be implemented at an owner information insertion point 220 and an owner control information insertion point 230. Although only a single owner information insertion point 220 and owner control information insertion point 230 are shown in FIG. 2, a complete insertion system may include more than one of each type of insertion point. In a large company, for example, corporate computer system administrators may be authorized to perform owner information insertion operations from administrator computer systems, or from any corporate computer system from which administrative functions can be accessed, thereby providing multiple owner information insertion points 220. Similarly, when an owner allows users to insert digitally signed owner control information onto electronic devices, as described above, each user's computer system may be used as an owner control information insertion point 230.

The systems and methods of owner application control can use the insertion structures and methods described above; however, so long as owner control information store is capable of storing a required application list, and in some instances an allowed application list and/or an excluded application list, the particular control information insertion system and method can vary significantly, and use any conventional insertion/interfacing technology, without impacting the owner application control systems and methods discussed herein.

Figure 3:
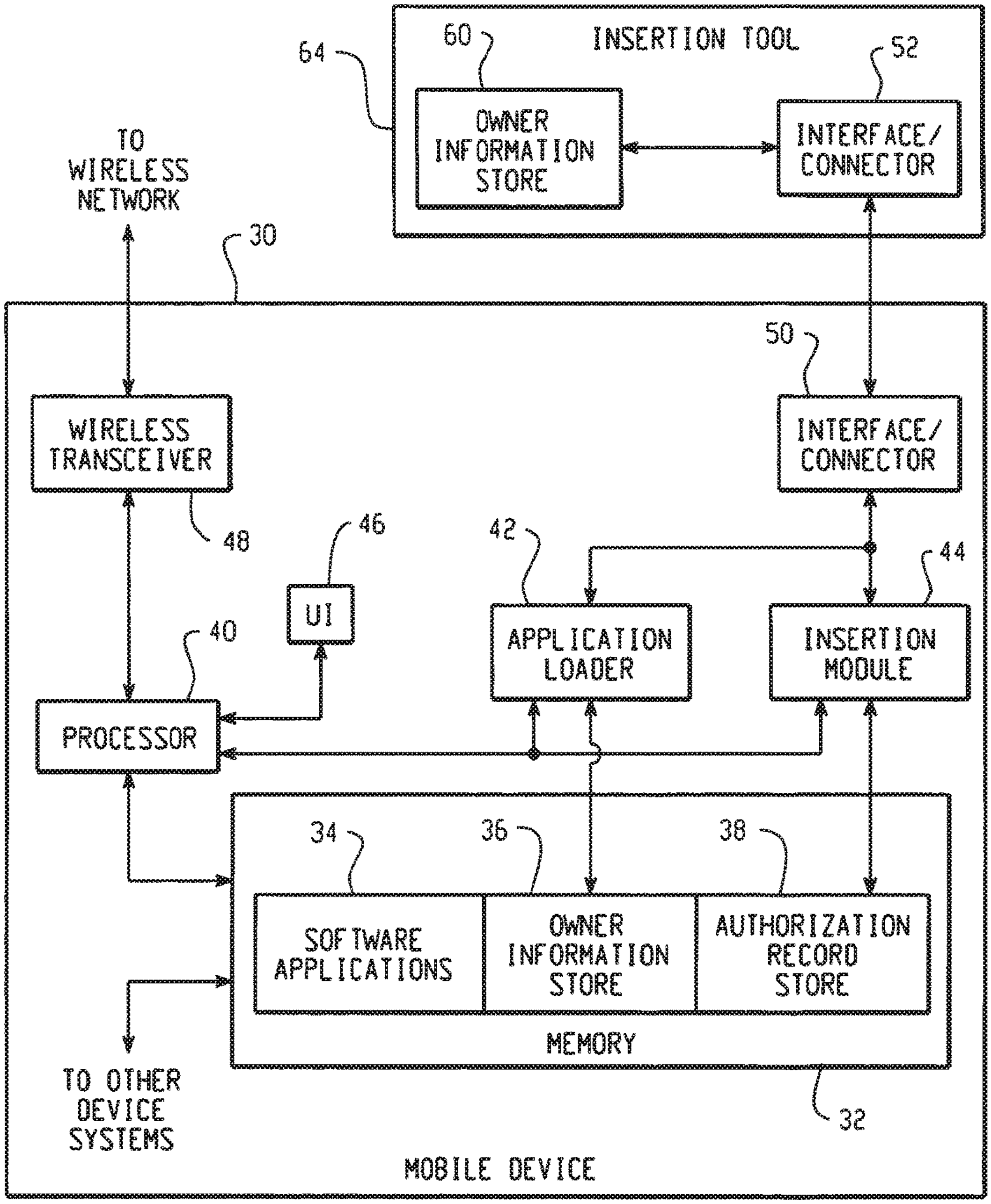
FIG. 3 is a block diagram of an electronic device in which a system and method of owner control are implemented.

FIG. 3 is a block diagram of an electronic device in which a system and method of owner application control can be implemented. In FIG. 3, the electronic device is a mobile device 30 adapted to operate within a wireless network. Also shown in FIG. 3 is an insertion tool 64 used to insert owner information onto the mobile device 30.

It should be apparent to those skilled in the art that only the components involved in an owner control system are shown in FIG. 3. A mobile device typically includes further components in addition to those shown in FIG. 3. Also, the mobile device 30 is an illustrative example of an electronic device for which an owner may wish to enforce some sort of usage policy. An owner may also wish to control the usage of other types of electronic devices, such as mobile telephones, laptop computers and PDAs, for example.

As shown in FIG. 3, a mobile device 30 comprises a memory 32, a processor 40, an application loader 42, an insertion module 44, a user interface (UI) 46, a wireless transceiver 48, and an interface/connector 50. The memory 32 can include a software applications store 34, an owner information store 36, an authorization record store 38, as well as possibly other data stores associated with other device systems in addition to those shown in FIG. 3.

The memory 32 is a writable store such as a RAM or Flash memory into which other device components may write data. However, write and erase access to the software application store 34, the owner information store 36, and the authorization record store 38 may be restricted, but need not be in all implementations. For example, a user of the mobile device 30 may be able to retrieve data from the stores 34, 36, and 38, but write and erase operations for these stores are controlled, as described below. The software application store 34 includes software applications that have been installed on the mobile device 30, and may include, for example, an electronic messaging application, a personal information management (PIM) application, games, as well as other applications. The owner information store 36 stores information such as an owner name or other identification, data integrity and source authentication information, such as a digital signature public key associated with a digital signature private key of the owner. Owner control information, in which an owner of the mobile device 30 specifies usage permissions and restrictions for the mobile device 30, is stored in an authorization record in the authorization record store 38. Such authorization records can include one or more of the aforementioned required, allowed and/or excluded application lists, or more specific operation constraints for specific allowed and/or required applications. It should be appreciated that the supported lists need not be stored as unit; rather, the lists can logically be formed from authentication records associated with individual applications, wherein the each application authentication records includes a field that designates the application appropriately (e.g., allowed, required, excluded, etc.) and can include a field containing an application identifier.

The processor 40 is connected to the wireless transceiver 48 and thus enables the mobile device 30 for communications via a wireless network. The application loader 42 and insertion module 44, described in further detail below, are connected to the interface/connector 50 to allow communication with the insertion tool 64, through the co-operating interface/connector 52.

The UI 46 includes one or more UI components, such as a keyboard or keypad, a display, or other components which accept inputs from or provide outputs to a user of the mobile device 30. Although shown as a single block in FIG. 3, it should be apparent that a mobile device 30 typically includes more than one UI, and the UI 46 is therefore intended to represent one or more user interfaces.

The insertion tool 64 includes an owner information store 60 and an interface/connector 52 through which information is exchanged with the mobile device 30, and thus represents an owner information insertion point 220 (FIG. 2). As described above, an owner information insertion point such as the insertion tool 64 is normally controlled by an owner of an electronic device. Therefore, the insertion tool 64 is, for example, implemented on an administrator computer system used by an authorized administrator to enable services for or otherwise configure the mobile device 30. Because networked computer systems can typically be used by any user, the insertion tool 64 may instead be accessible to any computer system in a corporate network, dependent upon the particular user that is currently "logged on" the computer system.

The owner information store 60 stores owner information to be inserted onto the mobile device 30, and may be implemented, for example, on a local memory component such as a RAM chip, a flash memory device, or a hard disk drive. When the insertion tool 64 is implemented in a networked computer system or other network-connected device, the owner information store 60 may be a remote memory system such as a file server that is accessible to the insertion tool 64 through a network connection. The owner information store 60 may instead incorporate a memory reader such as a smart card reader, a memory card reader, a floppy disk drive, or a CD or DVD drive, for example.

Information is transferred between the insertion tool 64 and the mobile device 30 via a communication link established between the interface/connectors 50 and 52. The interface/connectors 50 and 52 could be any of a plurality of compatible data transfer components, including, for example, optical data transfer interfaces such as Infrared Data Association (IrDA) ports, other short-range wireless communications interfaces, or wired interfaces such as serial or Universal Serial Bus (USB) ports and connections. Known short-range wireless communications interfaces include, for example, "Bluetooth" modules and 802.11 modules according to the Bluetooth or 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively. Therefore, a communication link between the insertion tool 64 and the mobile device 30 may be a wireless connection or a physical wired connection.

Because communications between the insertion tool 64 and the mobile device 30 need not necessarily be accomplished using a physical connection, references to connecting a mobile device to an insertion tool include establishing communications through either physical connections or wireless transfer schemes. Thus, the mobile device 30 could be connected to the insertion tool 64 by connecting serial ports on the mobile device 30 and the insertion tool 64, by positioning the mobile device 30 such that an optical port thereof is in a line of sight of a similar port of the insertion tool 64, or by connecting or arranging the mobile device 30 and the insertion tool 64 in some other manner so that data may be exchanged. The particular operations involved in establishing communications between a mobile device and an insertion tool are dependent upon the types of interfaces and/or connectors available in both the mobile device and the insertion tool.

Owner branding of the mobile device 30 may be facilitated by inserting owner information onto the mobile device 30 using the insertion tool 64 before the mobile device 30 is operable by a user. This may be accomplished, for example, by pre-loading owner information before the mobile device 30 is provided to the user by the owner, or before the mobile device 30 is configured for use. In the former example, the owner maintains physical control of the mobile device 30 until owner information has been loaded, whereas in the latter example, the user has possession of the mobile device 30 but is in this example unable to make use of the device until it is configured by, or at least under the control of, the owner.

Pre-loading of owner information onto the mobile device 30 can be performed using the insertion tool 64. The insertion tool 64 may be a computer system associated with an a owner system administrator, or a computer system which may be used by a mobile device user or administrator. Depending upon the owner information pre-loading scheme, the insertion tool 64 is operated by a mobile device user or an administrator.

When the mobile device 30 has been connected to the insertion tool 64, owner information is retrieved from the owner information store 60 and transferred to the mobile device 30 through the interface/connectors 52 and 50, and passed to the insertion module 44 on the mobile device 30, which stores the owner information to the owner information store 36 in the memory 32.

Although the insertion module 44 is shown in FIG. 3 as being connected to the interface/connector 50, this module can be implemented as a software module or application that is executed by the processor 40. As such, data transfers to and from the interface/connector 50 may actually be accomplished by routing data through the processor 40 to the interface/connector 50. In this case, the processor 40 may be instructed by the insertion tool 64 to start the insertion module 44 before the owner information is transferred to the mobile device 30. Alternatively, the processor 40 may be configured to start the insertion module 44 whenever owner information is received. The insertion tool 64 may similarly be a software module or application that is executed by a processor (not shown) in a computer system or device on which the insertion tool 64 operates.

The owner information that is pre-loaded onto the mobile device 30 may include data integrity and/or source authentication information, such as a cryptographic system like a digital signature public key which corresponds to a digital signature private key used by the owner to digitally sign information before it is transferred to the mobile device 30. Pre-loading of the data integrity and/or source authentication information enables greater security of owner control operations, as described in further detail below in the context of digital signatures. Owner information may also include, for example, a name or other identifier associated with the owner of the mobile device 30.

In an owner control scheme in which digital signatures are used to verify data integrity and authenticate a source of data, when the owner's digital signature public key has been inserted into the owner information store 36 on the mobile device 30, owner control information, which specifies permissions and/or restrictions for the mobile device 30, is inserted onto the mobile device 30. Although an owner information insertion point, insertion tool 64, is shown in FIG. 3, it will be apparent from FIG. 2 and the above description that owner control information is usually inserted onto an electronic device after the device has been branded by inserting owner information onto the device. An owner control information insertion tool (not shown) configured for use with the mobile device 30 is similar to the insertion tool 64, including an owner control information store and an interface/connector compatible with the interface/connector 50. Owner control information is inserted onto the mobile device 30 and stored in the form of an authorization record in the authorization record store 38. In an authorization record, an owner of the mobile device 30 specifies a list of software applications that a user is authorized to install on the mobile device 30, as well as possibly a list of required software applications that must be installed on the mobile device 30.

In order to prevent a user from inserting false owner control information to thereby circumvent owner control, owner control information can be digitally signed using the owner's digital signature private key before being transferred to the mobile device 30. The insertion module 44 may be configured to verify the digital signature before the owner control information is stored on the mobile device 30. If digital signature verification fails, then the owner control information is not stored on the mobile device 30.

Digital signature schemes can involve some sort of transformation of digitally signed information to provide for checking the integrity of the information and authentication of a source of the signed information. For example, according to one known digital signature technique, a digest of information to be digitally signed is first generated using a non-reversible digest algorithm or transformation. Known digest algorithms include Secure Hashing Algorithm 1 (SHA-1) and Message-Digest algorithm 5 (MD5). Other digest techniques that produce a unique digest for each unique input may also be used. The digest is then further transformed using a digital signature private key and a signature algorithm to generate a digital signature. In digital signature verification, a digital signature public key corresponding to the private key is used.

In the context of owner control and owner control information, insertion of the owner's digital signature public key on a mobile device 30 as part of the owner information provides for digital signature-based security of owner control information. If some or all of the owner control information is digitally signed before transfer to the mobile device 30, then the insertion module 44 can verify that owner control information has actually been signed using the owner's digital signature private key, known only to the owner, and that the owner control information has not been changed since it was signed. In this example, only owner control information that originates with the owner of a mobile device 30 is stored to and used on the mobile device 30.

Owner control information is obtained by an owner control information insertion tool from an owner control information store, which may be a remote data store accessible to the insertion tool, a local store, or some form of memory reader, as described above. Owner control information is established based on a set of software applications or functions that the owner wishes to authorize on an electronic device, and may tend to change relatively infrequently once established. Such owner control information could then be digitally signed by a secure computer system or software component to which only administrators have access, using the owner's digital signature private key. In this case, signed owner control information is then stored at a location that is accessible to administrator computer systems and possibly other computer systems, and retrieved by an owner control information insertion tool as required. The owner control information insertion tool then transfers the signed owner control information to the mobile device 30. Depending upon how often owner control information changes or is expected to change, the signed owner control information may be further distributed to each computer system in a network in order to provide local access to signed owner control information. When new owner control information is generated and signed, the signed new owner control information can replace all existing copies of the owner control information, as described in further detail below. Wide distribution of owner control information provides easier access to the owner control information, whereas shared remote storage of owner control information requires fewer updates when new owner control information is established.

It is also possible to support digital signature generation for owner control information on an owner control information insertion tool. However, in the present example, this would require that the owner control information insertion tool has access to the owner's digital signature private key. Unless otherwise desired, digital signing of owner control information only by secure computer systems or components is generally preferred in that it limits the number of computer systems that can access the owner's digital signature private key.

When signed owner control information is transferred to the insertion module 44, digital signature verification operations are performed. If the digital signature is verified, then the owner control information is stored on the mobile device 30 in the authorization record store 38. Otherwise, the owner control information is not stored. In the event of a digital signature verification failure, an error or like indication may be output to a user on a UI 46 such as a display, an error message may be returned to the owner control information insertion tool, and an indication of the failure may also be output to a user of the owner control information insertion tool. When owner control information insertion fails, retry or other error processing operations may be performed on the owner control information insertion tool, the mobile device 30, or both.

Given the importance of the owner digital signature public key in the present example, at least a first owner information insertion operation for any mobile device 30 is preferably either performed or at least authorized by an administrator, in order to ensure that accurate owner control information is inserted onto the mobile device 30. This prevents a user from circumventing owner control by inserting a digital signature public key other than the owner's digital signature public key onto the mobile device 30.

When owner control information changes, where an owner wishes to expand or further restrict the use of an electronic device, for example, any existing owner control information may be replaced. As described above, new owner control information may be digitally signed, and the signed new owner control information is distributed to one or more locations from which it is retrieved for insertion onto electronic devices.

Any of several mechanisms for subsequent distribution of signed new owner control information to electronic devices are possible. When new owner control information is distributed to each owner control information insertion tool, the insertion tool may be configured to detect receipt of new owner control information, and to transfer the new owner control information to the mobile device 30 the next time the mobile device 30 is connected to the owner control information insertion tool. As described above, an owner control information insertion point 230 (FIG. 2), such as an owner control information insertion tool, may be controlled by a user of an electronic device. Many modern electronic devices are configured to be synchronized with computer systems. In such systems, this type of owner control information distribution may be supported by implementing an owner information control insertion tool in a user's computer system. New owner control information is then transferred to the electronic device the next time the electronic device is synchronized with the computer system.

Alternatively, signed new owner control information may be sent by an owner to all owned mobile devices through a wireless network, via the LAN 18, the WAN 12, and the wireless network gateway 16, as shown in FIG. 1, for example. Such signed owner control information could be sent to the owned mobile devices either directly or through one or more owner control information insertion tools. Although the owner's digital signature public key may be initially transferred to a mobile device 30 through the interface/connectors 52 and 50, other communication links which cannot be physically secured or protected, such as wireless or public communication network links, may be used to subsequently transfer signed owner control information to an electronic device that is enabled for communications over such other links. When the owner's digital signature public key has been inserted on a mobile device 30, the insertion module 44 is able to verify both the integrity and the source identity of any signed owner control information received, whether it is received via the interface/connector 50 or the wireless transceiver 48. In this type of implementation, for example, an owner control information insertion tool may include a different type of interface to the mobile device 30 than the owner information insertion tool 64.

Initial storage of owner control information, as well as replacement of existing owner control information, is in this example thereby dependent upon verification of a digital signature by the insertion module 44. Other checks may also be performed before existing information is replaced. In order to prevent replay attacks, in which old owner control information is received by the electronic device, owner control information can include version information. A configuration can include an existing owner control information being replaced only where received owner control information is newer than the existing owner control information. Generally, newer owner control information has a higher version number.

Although owner information is inserted onto the mobile device 30 using the insertion tool 64 as described above, changes to existing owner information, such as when the owner's digital signature private/public key pair is changed, may alternatively be updated on the mobile device 30 using digital signature techniques. To this end, the insertion tool 64 may include other types of communication modules (not shown), such as a wireless transceiver or network connector, for example, that are less secure than the interface/connector 52. In that case, any such updates are dependent upon verification of a digital signature using a digital signature public key in existing owner information.

The foregoing description relates primarily to writing owner information and owner control information to memory on an electronic device such as the mobile device 30. However, an owner may also wish to erase owner information and owner control information, without replacing existing information with new information. In this case, because information is not being written to memory on a device, no signed owner information or owner control information would be sent to the device. Instead, an erase command or request may be sent to the device. Erasure may be a further function supported by the insertion module 44.

Referring again to FIG. 3, if owner information is to be erased from the owner information store 36, then an erase command or request is digitally signed and sent to the insertion module 44. As with new owner information or owner control information, a signed command or request could be sent to the mobile device 30 through either the interface/connector 50 or the wireless transceiver 48. The insertion module 44, using the owner's digital signature public key, executes the command or completes the request if a digital signature is verified. Otherwise, the command or request may be ignored, and an error or failure indication may be displayed to a user on a UI 46 on the mobile device 30, returned to a sending system or device that sent the command or request, or both. Further error or failure processing routines may then be performed at the sending system or device.

Since owner information includes the owner's digital signature public key in a signature-based owner control scheme, erasure of owner information can be tightly controlled. For example, only owner system administrators may be authorized to send erase commands or requests. Sending of signed commands or requests to the mobile device 30 can be restricted to administrator computer systems or accounts, an owner information insertion tool, or an owner-controlled erasure tool. For example, an insertion tool such as the insertion tool 64 could be adapted to erase existing owner information from the mobile device 30 by providing an erase command generator or store which is also coupled to the interface/connector 52. Alternatively, owner information erasure could be accomplished using a specialized, owner-controlled erasure tool incorporating such an erase command generator or store and an interface to the mobile device 30. Erasure of owner control information can be controlled in a similar manner.

Where an owner control system is configured to support erasure and possibly other owner information and owner control information management functions, access to the owner's digital signature private key may be restricted in order to control the information, requests, and commands that can be digitally signed and sent to an electronic device. The digital signature private key or digital signature generation functions may be accessible only to specific computer systems or administrator login accounts, for example.

As shown in FIG. 3, other systems on the mobile device 30 can have access to the memory 32. Configurations may be used wherein no device system is able to insert, change, or erase owner information or owner control information without submitting properly signed information or commands. Any data stores, such as the owner information store 36 and the authorization record store 38, that store owner information or owner control information can therefore be located in protected memory areas. Configuration may be used where only the insertion module 44 has write and erase access to these stores, such that digital signature-based control of insertion and erasure of owner information and owner control information are maintained. Other device systems have read only access to owner information and owner control information. In one possible implementation, any systems or components through which the memory 32 is accessible are configured to allow memory read operations from any locations in the memory 32, but deny any write or erase operations to memory locations storing owner information or owner control information unless the operations originate with or are authorized by the insertion module 44. In an alternative implementation, a memory manager (not shown) is provided to manage all memory access operations. Such a memory manager is configured to direct any write or erase operations involving owner information or owner control information stores to the insertion module 44 for digital signature checking and authorization before completing the operations. Owner information and owner control information may thereby be read by other device systems, but preferably may only be inserted, changed, or erased when a digital signature is verified.

It should be appreciated that the above public key digital signature operations are intended only as an illustrative example. Other digital signature schemes, or other data integrity checking and source authentication schemes, may instead be used to verify the integrity and source of owner control information or commands. Further, the authentication and security described herein above can be used to transfer the owner application control information; however, various systems and methods of owner application control need not use authentication and/or secure transmission in order to achieve the desired owner application control as described herein.

In the mobile device 30, owner control information is included in an authorization record that is stored in the authorization record store 38. An authorization record specifies particular software applications that are authorized for installation on the mobile device 30, and may also specify required software applications that must be installed on the mobile device 30. Such an authorization record provides an electronic device owner with relatively tight control of how a user makes use of the mobile device 30, since only authorized software applications can be loaded onto the device.

For authorized and/or required applications, some systems can provide a more fine grained control within the authorization record(s). In such systems, the owner can provide more specific controls on the operations that installed application can perform. Such controls can be specified on an individual application basis, or in some cases by groups of applications. Such operation controls can determine whether an application can connect to external resources, and if so, the channels (that may be used for such connections) can communicate with other applications executing on the device and/or can access part or all of local memory on the device.

Software application loading operations are enabled on the mobile device 30 by the application loader 42. As described above in regard to the insertion module 44, although the application loader 42 is shown as being connected to the interface/connector 50, information may actually be exchanged between the application loader 42 and the interface/connector 50 or the wireless transceiver 48 through the processor 40.

Like owner information and owner control information, software applications may be received by the mobile device 30 via the interface/connector 50 or the wireless transceiver 48. One possible source of software applications configured for operation on the mobile device 30 is a user's computer system equipped with an interface/connector compatible with the interface/connector 50. When the computer system is connected to a corporate LAN, for example, software applications provided by a corporate owner of the mobile device 30 may be retrieved from a file server on the LAN or other store on the LAN, and transferred to the mobile device. A computer system may also or instead obtain software applications for the mobile device 30 from a local store, or other sources, such as Internet-based sources, with which the computer system may communicate.

The application loader 42 may be configured to determine whether owner control information is stored on the mobile device 30 whenever a software application is received. If no owner control information is present on the mobile device 30, then no owner controls have been established for the mobile device 30, and the software application is installed. Alternatively, the application loader 42 could consult a remote server for an owner control information update prior to attempting the installation. Software application installation typically involves such operations as storing a received application file to the software application store 34 in the memory 32, extracting files for storage to the software application store 34, or possibly executing an installation program or utility. If owner control information is subsequently inserted onto the mobile device 30, existing software applications may be checked by either the application loader 42 or the insertion module 44 to ensure that all software applications resident on the mobile device 30 are authorized software applications. Any software applications that have not been authorized are erased from the mobile device 30 or otherwise rendered inoperable.

In some circumstances, owner information may have been inserted onto an electronic device, but owner control information has yet to be inserted. In order to prevent loading of a software application onto the mobile device 30 that subsequently inserted owner control information does not authorize, the mobile device 30 may be substantially disabled, permitting only a limited subset of device functions to be executed, until owner control information is inserted. Alternatively, the application loader 42 may be configured to determine whether owner information is present on the mobile device 30 when a software application is received. Where owner information is found, indicating that owner control information will be established and used for the mobile device 30, the application loader 42 then determines whether owner control information has been inserted. In the event that owner information but not owner control information is found, the application loader 42 does not load the received software application. Error processing operations may then be performed, such as purging the received software application from any temporary memory location in which it was stored when received, and, if memory resources on the mobile device 30 permit, storing the received software application on the mobile device 30 in such a way that it is not executable. Any software applications stored in this manner are then processed by the application loader 42 when owner control information is inserted onto the mobile device 30. Although software applications are stored on the mobile device 30 in this example, they would not be usable until owner control information is inserted onto the mobile device 30, and it is confirmed that the software applications are authorized for installation. The amount of memory space made available for such software applications may occupy can be limited, so that available memory space will not be depleted by storing unchecked and possibly unauthorized software applications.

When the application loader 42 determines that owner control information has been inserted onto the mobile device 30, the application loader 42 then determines whether the received software application is authorized for installation on the mobile device 30. If the owner control information includes an authorized software application list, the application loader 42 searches the list to determine whether the received software application is one of the authorized software applications. Alternatively, an authorized (allowed) software application list residing on a remote or external device (e.g., remote computer system, external card or memory device, etc.) can be consulted to determine whether a particular application is authorized for installation. In some such cases, the approval response from the remote or external device can include the application for installation, or information from which a source for the to-be installed application can be obtained; upon receipt, the device can download and/or install the application based upon the received approval response.

An authorized software application list can include information that uniquely identifies the authorized software applications, such as a hash of the software application source code or executable code, for example. Because a software application developer is free to choose a file name for any software application, file names may not provide a reliable authorization check. However, if an owner generates a hash of each authorized software application and includes the hash in the owner control information that is inserted onto the mobile device 30, then only particular versions of authorized software applications can be installed on the mobile device 30. The application loader 42 generates a hash of any received software application, and installs the software application only if the generated hash matches a hash in the owner control information. In order to support different hashing algorithms on different electronic devices, a device owner generates more than one hash of each software application and includes each hash in the owner control information inserted onto each owned electronic device. An electronic device may then use any of a number of different hashing algorithms to generate a hash of a received software application. Other unique transformations than hashes could also be used to generate owner control information and to determine whether received software applications are authorized for installation.

In some instances, prior to checking the authorized application list, at periodic intervals or upon a remote authorization change, the device can receive an authorized application list, or an authorized application list update, from a remote server or external device controlled by the device owner. The list or list update can be received in response to a request by the device (e.g., request a list or update upon installation attempt) or without such a request (e.g., responsive to an authorization modification by the owner on a remote owner administration server). Upon receipt of an authorized list, the device can install the list overwriting any prior list; upon receiving an update, the update is processed and integrated into an existing list, or used to create a list if none was present prior. In some instances the secure insertion tools, and/or other encryption/authentication, approaches as described herein can be used to provide the authorized application list to the device.

Owner control information may also include a required software application list that uniquely identifies software applications that the owner of an electronic device establishes as mandatory; alternatively, such a required software application list could reside on a remote or external device (e.g., remote computer system, external card or memory device, etc.) that can be consulted at need. A required software application list allows an owner to ensure that every owned electronic device supports certain core functions, such as electronic messaging and secure communications, for example.

Software applications in a required software application list may be uniquely identified by one or more hashes, as described above in the context of authorized applications. The processor 40, application loader 42, insertion module 44, or a further device component or system is configured to periodically check to ensure that each required software application is present on the mobile device 30, and that a hash of each required software application matches a hash in the required software application list. In addition, or instead, at power up or other initialization of the device, presence of required applications can be checked. Where a required software application is not present on the device or its hash does not match a hash in the required software application list, which would occur when a software application has been changed, the mobile device 30, or at least some of its functions, can be rendered unusable. Alternatively, the mobile device 30 can download and install missing or corrupted applications transparently to the user of the device; after successful installation of all required programs, the device is restored to operability.

Figure 8:
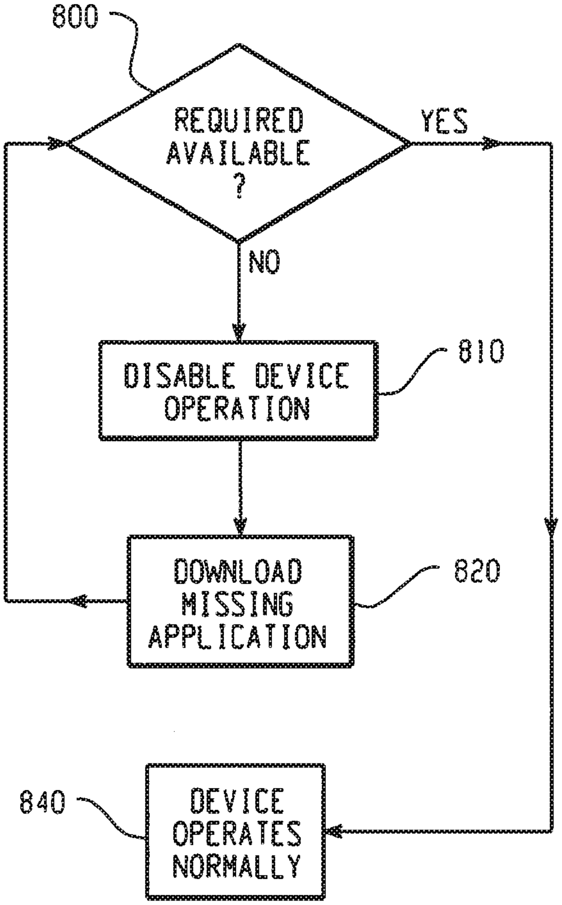
FIG. 8 is a flow diagram illustrating a method of device initialization of required applications.

In some instances, device initialization may include use of the required software application list. Such a process is shown in FIG. 8. A determination is made as to whether required applications are available on the device in step 800. The device examines installed applications to determine if applications on the required software application list are available on the device. This can occur through examination of the required software application list residing in the owner control information store. Alternatively, identification information associated with installed applications can be transmitted to a remote server managed by the owner that performs the comparison and returns the results of such a comparison to the device. If required applications are missing the device is disabled in part, or in whole, in step 810. The device may transparently initiate download of required applications that were determined to be unavailable 820. In implementations using a remote server to perform the comparison, some such implementations may allow the remote server to directly return any missing applications to the device. When all required applications are present the device operates normally 840.

Prior to checking for the presence of required applications, at periodic intervals or upon a remote authorization change, the device can receive a required list, or a required list update, from a remote server or external device controlled by the device owner. The list or list update can be received in response to a request by the device (e.g., request a list or update at initialization) or without such a request (e.g., responsive to an authorization modification by the owner on a remote owner administration server). Upon receipt of a required list, the device can install the list overwriting any prior list; upon receiving an update, the update is processed and integrated into an existing list, or used to create a list if none was present prior. In some instances the secure insertion tools, and/or other encryption/authentication, approaches as described herein can be used to provide the required application list to the device.

In order to provide further control over required software applications, erasure or other operations involving such applications are controlled. Digital signature-based control of such functions is implemented by requiring a digital signature on any erase or write command that affects a required software application. When an erase or write command is received from a system on the mobile device 30 or from a remote system via the interface/connector 50 or wireless transceiver 48, the processor 40 or another device system such as a memory manager (not shown) determines whether the command involves the software application store 34. Such a write or erase command is not executed unless a digital signature is verified using the owner's digital signature public key stored on the mobile device 30. Although software applications may be executed by device systems without requiring digital signatures, required software applications, if so desired, may only be changed or erased when a digital signature is verified. As above, digital signatures represent one possible data integrity and source authentication mechanism.

Owner control information may also include an excluded software application list that uniquely identifies software applications that the owner of an electronic device establishes cannot be installed on the device. An excluded software application list allows an owner to ensure that every owned electronic device does not contain particular malicious and/or counter productive software applications. Software applications in an excluded software application list may be uniquely identified by one or more hashes, as described above in the context of authorized applications. The processor 40, application loader 42, insertion module 44, or a further device component or system is configured to periodically check to ensure that no excluded software application is present on the mobile device 30, and that a hash of each present software application does not match a hash in the excluded software application list. Where an excluded software application is present on the device or its hash does match a hash in the excluded software application list, which would occur when a software application has been changed, the mobile device 30, or at least some of its functions, can be rendered unusable. Alternatively, the mobile device 30 can delete an excluded application found present on the device transparently to the user of the device; after successful deletion, the device is restored to operability.

In many cases, the excluded application list can be maintained remotely on a remote server or on an external memory device rather than in a memory area local to the device. In such instances, application loader can transmit a request to the remote server or search the external memory device (e.g., memory card, network attached disk, etc.). In such cases, the remote server consults the excluded list, or the device searches the external memory device, to determine whether the to-be installed application has been designated as excluded. In the case of a remote server, the remote server would transmit to the device either an approval or a denial as appropriate. The device could determine approval or denial directly from its consultation of an external memory device.

When an application installation request is received by a device supporting an excluded application list, the excluded application list is consulted based upon the application to-be installed. If the application to-be installed is found on the excluded application list, the installation request is denied and the application is not installed on the device. In machines supporting an allowed list and/or a required list in addition to an excluded list, a list priority could be established to determine how the device handles installation requests for applications that are on multiple lists. For instance, if a particular application appears on both the required list and the excluded list, a conflict exists. A priority scheme can be used to resolve such conflicts. In one such scheme, if an application is on the required list, its presence on other lists is not considered; if an application is on the authorized list and the excluded lists, then the application is considered excluded as the more conservative approach.

In instances where allowed, required and/or excluded lists are supported, some or all these lists can be maintained locally within the devices owner control information store; alternatively, one or more supported lists could be maintained remotely or on an external memory device.

Figure 4:
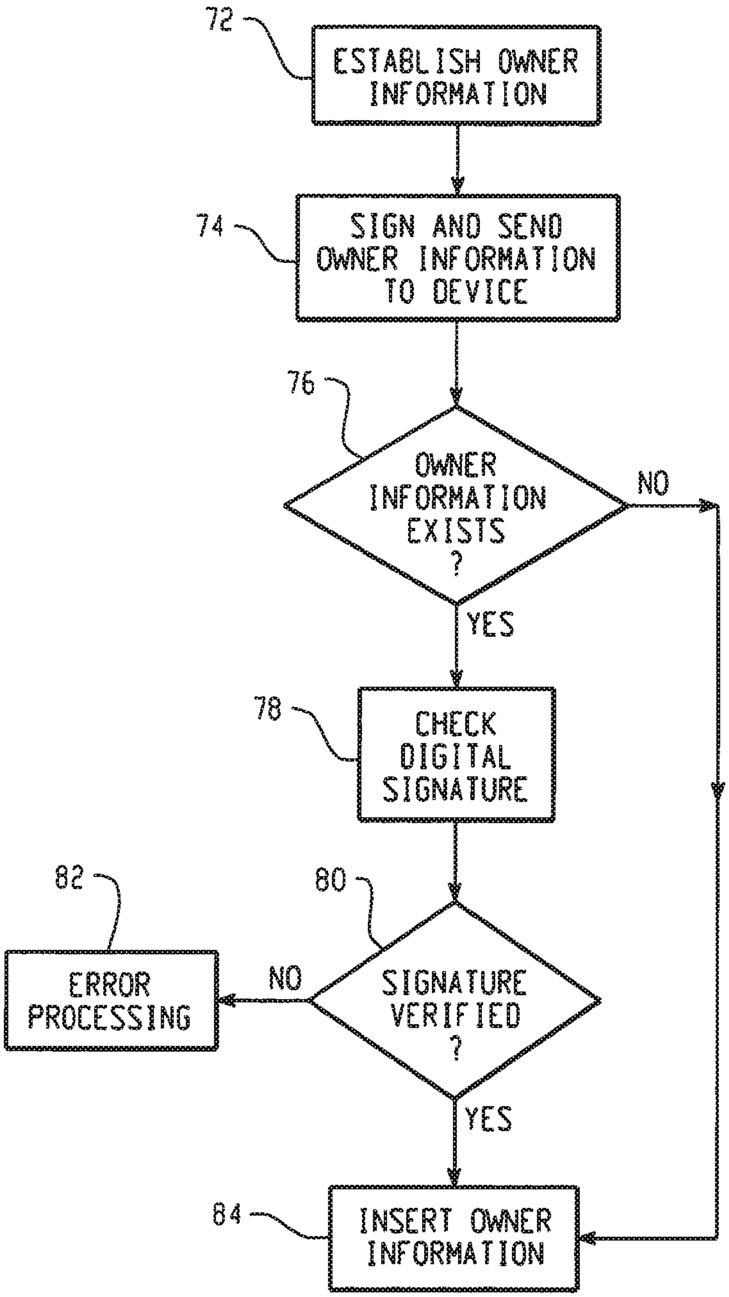
FIG. 4 is a flow diagram illustrating a method of inserting owner information onto an electronic device.

FIG. 4 is a flow diagram illustrating a method of inserting owner information onto an electronic device; this method may be used in connection with inserting the owner application control information onto the electronic device. The method in FIG. 4 begins at step 72, when an electronic device owner establishes owner information. This involves such operations as selecting an owner name or identifier and generating or obtaining an owner digital signature private/public key pair, for example. The owner information is then digitally signed and sent to the electronic device at step 74.

At step 76, a determination is made as to whether owner information already exists on the electronic device, by checking an owner information store, for example. When owner information does not exist on the electronic device, such as for an initial insertion of owner information, the owner information is inserted onto the electronic device at step 84, by storing the owner information to a memory on the electronic device. When the owner information is initially being inserted onto the electronic device, it need not necessarily be digitally signed. As described above, initial owner information insertion may be performed directly by or at least under the authorization of the owner or an owner system administrator.

A digital signature associated with the owner information is checked at step 78 where owner information already exists on the electronic device. If the digital signature is not verified, as determined at step 80, the owner information cannot be inserted onto the electronic device, and error processing is invoked at step 82. As described above, error processing may include such operations as indicating an error or failure on a UI of the electronic device and sending an error or failure message to an insertion tool or system from which the owner information was sent. The owner information is inserted onto the electronic device at step 84 where the digital signature was verified.

Figure 5:
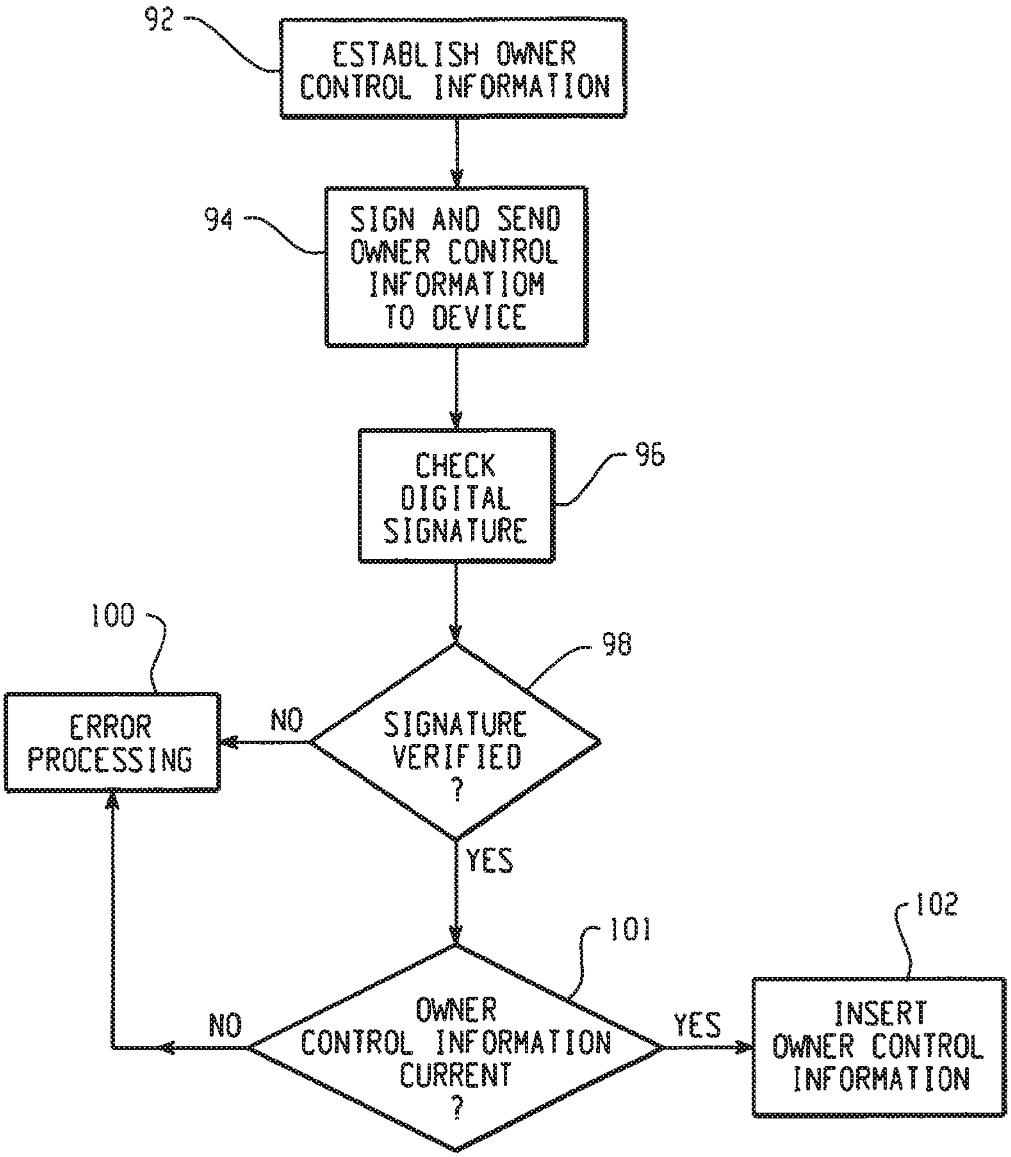
FIG. 5 is a flow diagram illustrating a method of inserting owner control information onto an electronic device.

Once owner information has been inserted onto an electronic device, owner control information is inserted onto the electronic device to set up owner controls. FIG. 5 is a flow diagram illustrating a method of inserting owner control information onto an electronic device.

At step 92, owner control information is established, based on how an owner wishes to control an electronic device. Owner control information, as described above, may include an authorized software application list and a required software application list, for example. The owner control information is then signed and sent to the electronic device at step 94. The digital signature on the owner control information is then checked at step 96. At step 98, it is determined whether the digital signature is verified. Error processing, which may involve operations similar to those described above in conjunction with step 82 in FIG. 4, is performed at step 100. If owner information including the owner's digital signature public key has not been previously inserted onto the electronic device, or the owner control information was not signed using the digital signature private key corresponding to the owner digital signature public key inserted onto the electronic device, then the digital signature is not verified at step 98.

When the digital signature is verified at step 98, it is then determined at step 101 whether the received owner control information is current, such as by determining whether a version number of the received owner control information is greater than the version number of existing owner control information. The owner control information is inserted onto the electronic device at step 102 when the digital signature was verified and the received owner control information is current, by storing the information to an appropriate data store on the electronic device, for example. Otherwise, error processing is performed at step 100.

Other operations may also be dependent upon verification of digital signatures. For example, commands or requests to write data to or erase data from an owner information store, an owner control information store, or a software application store may be similarly processed to verify associated digital signatures before the commands or requests are completed.

The owner control information, such as the software application lists and the application operation restrictions described above, can be maintained on a remote server managed by the device owner. The remote server can maintain a device data store, that may be in the form of a database, that stores the control information, including application control information, associated with owned devices.

For each device, or for groups of devices, particular application lists (e.g., required, authorized and/or excluded) and allowable operations for particular applications can be created, modified, stored and distributed. In some implementations, a graphical user interface can be provided through which the owner can specify the particular control information associated with a device or device group.

Owner control information regarding particular applications can be provided to the electronic device from a remote source (e.g., remote computer system server, local memory device such as memory card or disk, etc.) via a wired (or other direct connection based upon physical contact of the device with the source) or a wireless (e.g., IR, 802.11, Bluetooth, etc.) communication channel. In such cases, the policy information including installation constraints and/or application operation constraints can be provided in a predefined format. The received policy information can then be used to create, update and/or delete authentication records.

In one implementation, the following format can be used to encode the owner control information regarding an application:

<encoding>=<version><connection set>*<cod file data>*

<version> is a byte. The current version is 0.

<connection set>=a UTF8 string of comma separated domains

<cod file data>=<hash><flags><internal connections set index (a byte)><external connections set index (a byte)>

The download default is specified by a cod file data with a hash of all zeros.

<hash> is a 20 byte SHA1 hash of the cod file

<flags> is a 32 bit int.

Required App=1
Excluded App=2
Inter-Process Communication Allowed=4
Internal Network Connections Allowed=8
External Connections Allowed=16
Local Connections Allowed=32

The policy information associated with specific applications can be stored either on a remote server or memory device for delivery to the electronic device. Such storage can in some instances conform to the above described format. The policy information can be for an application can be associated with a particular electronic device or a particular group of electronic devices. Alternatively, some or all of such policy information can be stored remotely and queried upon request from the device.

FIG. 9 depicts one possible user interface provided via a remote server for an owner to configure application policy information for particular applications. In this particular example interface, particular groups of electronic devices by device type have particular owner control information associated therewith for particular applications. An information technology manager for the device owner can control the policy for a given set of devices by changing the provided configuration information. Such changes could then be transmitted to individual devices. In the depicted example, the application list is being used in the context of constructing a "target configuration" in which the handheld will be required to have the browser and security applications, as well as the phone application, but the memo pad and tasks applications are optional (allowed but not required). A user can select a row as shown at 900 in order to modify one or more of the values associated with an entry.

A remote server can be used to store owner control information associated with one or more electronic devices, or groups of devices. The remote server can communicate with the one or more devices via any suitable communication channel (e.g. wired or wireless connection). The remote server can use owner control information insertion tools as described herein. The owner control information on the remote server can be managed in a variety of ways including through provision of a management user interface such as the one depicted in FIG. 9. The management user interface can be provided directly by the remote server, or alternatively be provided by a computer system that communicates with the remote server.

As has been discussed previously, the required, allowed and/or excluded application lists can be either locally or remotely (including an external memory device) queried, depending upon particular implementation. In either case, the supported lists can be maintained by a remote server that the owner could control. In the case of an external memory device used for list consultation, the memory device could be a shared access device (e.g., network disk) accessible by the device and an owner management system, or the memory device could be a removable media or memory card that is temporarily connected to either the remote server, or a separate management system in communication with the remote server. In the latter case, list information would be stored on the memory device for later insertion or access by the owner controlled device.

If lists are locally maintained, the device may periodically or upon occurrence of specific events (e.g., initialization, installation request, etc.) query the remote server for a list or list update. Upon receipt of a request by the remote server, the server would determine the list appropriate for the requested device based upon device type and/or an individual device identifier. The remote server would then transmit the determined list or list update to the requesting device. A server side change to the list could trigger an unsolicited push of the list to the device. In which case, the server would determine impacted devices based upon the server side change and transmit the list or list update to the impacted devices.

Figure 6:
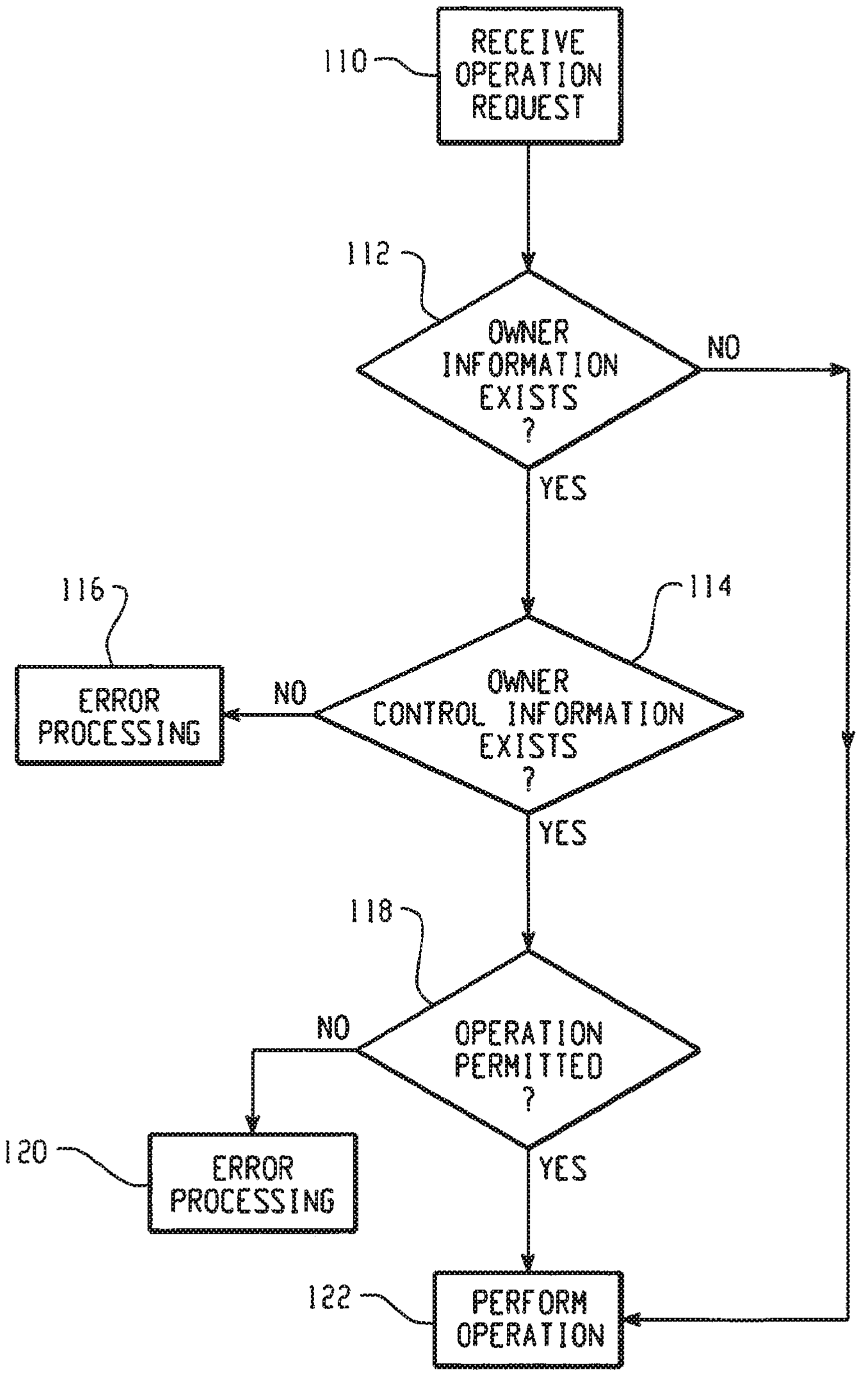
FIG. 6 is a flow diagram showing a method of owner control of an electronic device.

Owner control information is then used to control the electronic device. FIG. 6 is a flow diagram showing a method of owner control of an electronic device. At step 110, an operation request is received at the electronic device. Operation requests include, for example, receipt of a software application for installation, a function call from a software application executing on the electronic device, an attempt by a user, software application, or a system on the electronic device to perform an operation, and the like. Such requests may originate with a user, a software application, a device system, or possibly a remote system or device. If owner information does not exist on the electronic device, as determined at step 112, then owner controls have not been established and the operation is performed at step 122. In the example of a received software application, step 122 involves installation of the software application on the electronic device.

When owner information exists, it is determined at step 114 whether owner control information exists. Error processing operations are performed at step 116 if owner information, but not owner control information, exists. As described above, determining whether owner information exists at step 112, and then reverting to error processing at step 116 where it is determined at step 114 that owner control information does not exist prevents certain operations, such as software application loading and installation, when an owner information has been inserted onto an electronic device, but owner control information has not yet been inserted. Step 116 may include such operations as presenting an error message to a user of the electronic device and returning an error indication to a source from which the operation request was received. Alternatively, a default action in response to a negative determination at step 114 could be to revert to step 122, when an owner does not wish to restrict device operations before owner control information is inserted.

When both owner information and owner control information have been inserted onto an electronic device, it is determined at step 118 whether the operation is permitted. In the case of a received software application, step 118 involves determining whether software application installation is permitted, and possibly whether the software application is an authorized software application. In the case of authorized applications, the requested operation could include, for example, an application requesting opening a connection (e.g., network connection—MDS, WAP, SMS, TCP, etc. or local—USB, serial, etc.), accessing the telephone API, accessing local memory or communicating with other applications executing on the device. The operation is performed at step 122 where the operation is permitted. Otherwise, error processing is performed at step 120. As described above, owner control information may include not only permissions and restrictions for electronic device operations and software applications, but also a list of required software applications or modules which may be checked from time to time to ensure that all required software applications are present on an electronic device. For example, an electronic device may be configured to check for required software applications at step 118 when certain types of operation requests are received, and to perform the operation at step 122 only when all required software applications are found.

It will be appreciated that the above description relates to the invention by way of example only. Many variations on the systems and methods described above will occur to those knowledgeable in the field, and such variations are within the scope of this application, whether or not expressly described. As an example, a system of owner application control of an electronic device can comprise an owner control information store configured to store owner control information for controlling operation of the electronic device, and more specifically installation and/or deletion of applications on the electronic device and/or restrictions on operations by applications once installed. The owner control information can comprise a list of one or more required applications. In some instances, the owner control information can further comprise a list of one or more allowed applications and/or a list of one or more excluded applications. The owner control information store can reside on the controlled device or on one or more remote servers; alternatively, portions of the owner control information store can be distributed between the controlled device and one or more remote servers. In addition to, or instead of, the required list, the allowed list and/or the excluded list, the owner control information can comprise one or more constraints that control operations that can be performed by an application or a group of applications.

A method of owner application control may include variety of steps that in some implementations can be in the form of computer executable instructions stored on one or more computer readable media and/or be distributed via one or more data signals. Such a method can includes verifying that an application in a required list in an owner control information store is available for execution on the device, and if the application in the required list is not verified as available, initiating download and installation of such application from an external application source such as a computer system or memory device. The electronic device can in some instances be disabled from operating normally until applications on the required list are available for execution on the device. More specifically, at least one operation of the device can be disabled until the required application is available for execution.

As another example, a method may in some instances include steps of storing owner information having a required list having data integrity and/or source authentication information on an electronic device, receiving owner control information at the electronic device, and checking integrity of the received owner control information and/or determining whether the authorized source is authentic.

In addition to, or instead of, the steps provided above, a device can perform the steps of receiving an operation request from an application and determine whether the application is allowed to perform the requested operation based upon owner control information associated with the application. The requested operation is only executed if the requested operation is determined to be allowed for the application.

As yet another example, a system can be configured for owner application installation control of an electronic device. An owner control information store can be configured to store owner control information having a required list identifying one or more applications required for full operation of the electronic device. Initialization processor instructions (e.g., as implemented in a software module, etc.) can be used to consult (e.g., directly or indirectly have access to) owner control information in the owner control information store in order to verify if an application in the required list is available for execution on the electronic device. An application loader module that is invoked by the initialization instructions when the application in the required list is not available for execution and that downloads the application from an external application source and installs it on the electronic device. Operation control instructions can be used to disable at least one operation of the electronic device until the application loader module completes installation of the application.

A method may also be configured for designating owner control of application operations for an electronic device by receiving an operation indication of one or more operations associated with a particular application; generating an authorization record based upon the received operation indication and the particular application; storing the generated authorization record; receiving a device indication of one or more electronic devices subject to owner control; receiving a correspondence indication that associates the received device indication with one or more stored authorization records; and communicating one or more stored authorization records to one or more electronic devices based upon the received device indication and the received correspondence indication.

Still further as another example, owner information and owner control information operations may be secured by other means than digital signatures. Instead of checking digital signatures on owner information, owner control information, and restricted commands or requests, an electronic device might issue a cryptographic challenge using a previously inserted encryption key associated with the owner. The encryption key could be a public key of the owner or a secret key shared between the owner and the electronic device. Operations such as owner information or owner control information insertion or erasure would then be performed only when a valid challenge response is returned. A valid challenge response may only be generated using a corresponding encryption key. Data integrity and source authentication could instead be assumed, for example, where owner information and owner control information are sent to an electronic device over a secure channel. If the device properly decrypts information received via the secure channel, then it is assumed that the information is valid and was sent by an authorized source. In this latter scheme, the source and device share a public/private key pair, or a common symmetric key.

In some instances, owner control information such as owner application control information can reside on a remote server rather than on the electronic device. For instance, one or more of a required, authorized and/or excluded application list can reside on a remote server. In such instances, an operation request such as application installation or device initialization can generate a query to the remote server where such lists reside. The proper list can be consulted and an appropriate response returned to the inquiring device.

Figure 7:
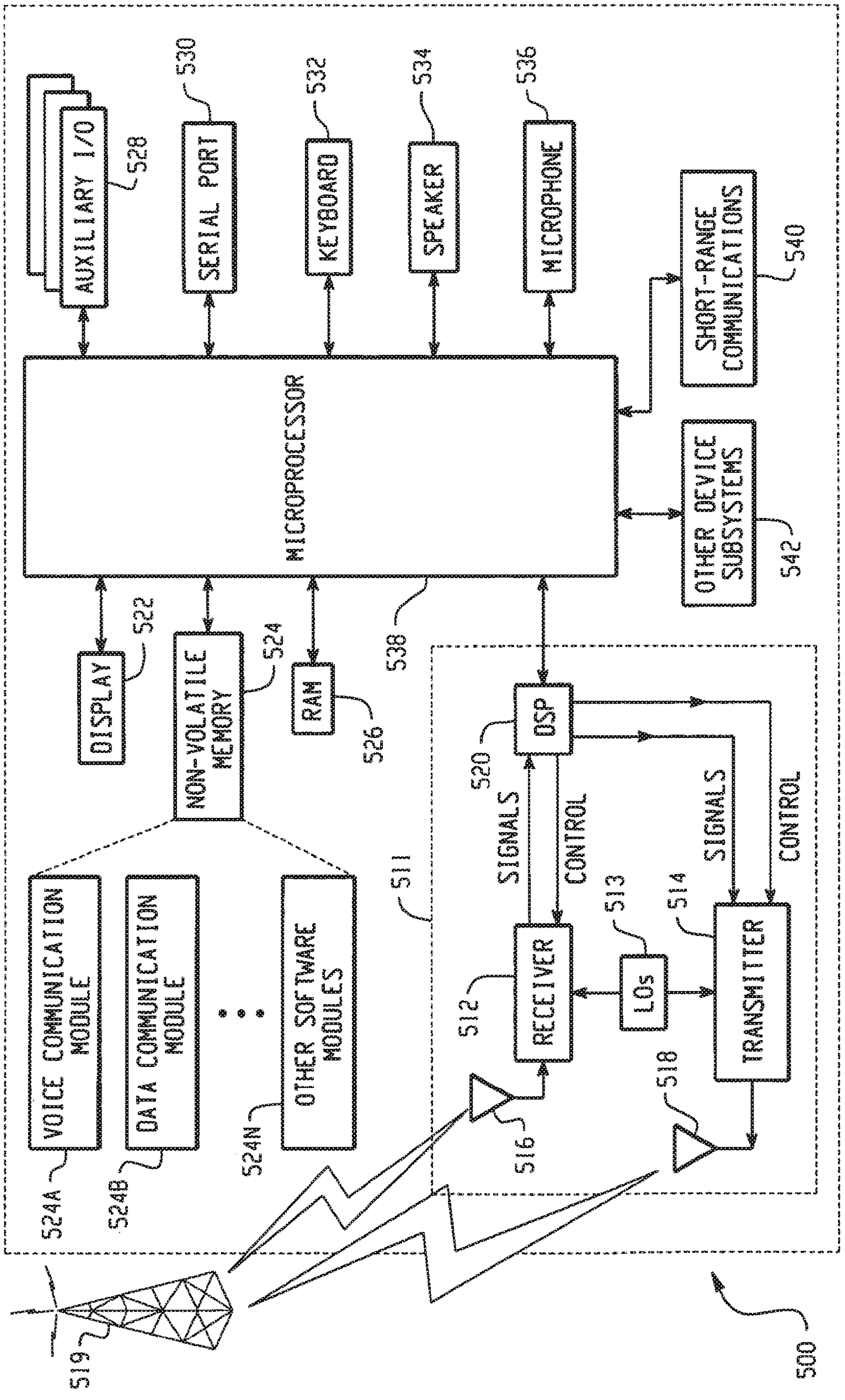
FIG. 7 is a block diagram of a wireless mobile communication device as an example of an electronic device.

In addition, an electronic device in which systems and methods described above are implemented may include fewer, further, or additional components than shown in FIGS. 2 and 3. FIG. 7 is a block diagram of a wireless mobile communication device as an example of such an electronic device. However, it should be understood that the systems and methods disclosed herein may be used with many different types of devices, such as personal digital assistants (PDAs) and desktop computers.

As shown in FIG. 7, mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities).

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 7 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of Los 513 can be used to generate frequencies corresponding to those used in the network 519. Although two antennas 516, 518 are depicted in FIG. 7, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536. Such interfaces are designated generally as UI 46 in FIG. 3.

Some of the subsystems shown in FIG. 7 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for owner information and owner control information. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert owner information and owner control information onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Owner information, owner control information and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile-device 500 is operating in a data communication mode, a received signal, such as a text message or a web page download, will be processed by the transceiver 511 and provided to the microprocessor 538, which preferably further processes the received signal for output to the display 522, or, alternatively, to an auxiliary I/O device 528. Owner information, owner control information, commands or requests related to owner information or owner control information, and software applications received by the transceiver 511 are processed as described above. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also to be included in the mobile device 500. For example, the subsystem 540 may include an infrared device and associated circuits and components, or a Bluetooth or 802.11 short-range wireless communication module to provide for communication with similarly-enabled systems and devices. Thus, owner information insertion, owner control information insertion, and application loading operations as described above may be enabled on the mobile device 500 via the serial port 530 or other short-range communications subsystem 540.

It is to be understood that FIG. 7 represents an example of an electronic device in which owner control systems and methods described above may be implemented. Implementation of such systems and methods in other electronic devices having further, fewer, or different components than those shown in FIG. 7 would occur to one skilled in the art to which this application pertains and are therefore considered to be within the scope of the present application. For example, although a SIM card has not been explicitly shown in FIG. 7, it should be appreciated that implementation of owner control systems and methods in electronic devices with SIM cards is contemplated. Since SIM cards currently incorporate a memory component, owner information, owner control information, or both, may be inserted onto a SIM card and used to maintain owner control of an electronic device when the SIM card is installed in the electronic device. In this case, a SIM card could be branded by inserting owner information onto the SIM card, and owner control information could then be inserted onto the SIM card or an electronic device in which the SIM card is installed.

What is claimed:

1. A method of application control on an electronic device, the method comprising:

receiving, by the electronic device, owner control information from an owner of the electronic device, the owner control information comprising:

an identification of the owner of the electronic device, the owner being different from a user of the electronic device;

an identification of one or more applications having an installation status on which the owner of the electronic device predicates operation of functions of the electronic device independent of functions of the one or more applications; and one or more permissions associated with the identification of the one or more applications permitted for installation on the electronic device, where:

for a first of the one or more applications, a first of the one or more permissions allows operation of a first function of the electronic device only when the first of the one or more applications is not installed on the electronic device; and for a second of the one or more applications, a second of the one or more permissions allows operation of a second function of the electronic device only when the second of the one or more applications is installed on the electronic device, the second function being a function independent of functions provided by the second of the one or more applications;

storing, by the electronic device, the owner control information in a data store of the electronic device; and controlling access of the user to the electronic device based upon the owner control information.

2. The method of claim 1, wherein an application is previously installed on the electronic device, and wherein controlling access based on the owner control information comprises automatically deleting the application from the electronic device.

3. The method of claim 1, wherein an application is previously installed on the electronic device, and wherein controlling access based upon the owner control information comprises disabling at least one operation of the electronic device independent of the application until the application is deleted from the electronic device.

4. The method of claim 1, wherein an application is not present on the electronic device, and wherein controlling access based on the owner control information comprises permitting installation of the application on the electronic device based upon a determination that the application is permitted for installation on the electronic device according to the owner control information.

5. The method of claim 1, wherein an application is not present on the electronic device, and wherein controlling access based on the owner control information comprises preventing installation of the application on the electronic device based upon a determination that the application is not permitted for installation on the electronic device according to the owner control information.

6. The method of claim 1, wherein an application is not present on the electronic device, wherein the application is a required application, and wherein controlling access based upon the owner control information comprises disabling at least one operation of the electronic device independent of the application until the application is installed on the electronic device.

7. The method of claim 1, wherein an application is previously installed on the electronic device, and wherein controlling access based on the owner control information comprises preventing deletion of the application.

8. The method of claim 1, wherein an application is previously installed on the electronic device, and wherein controlling access based on the owner control information comprises restricting at least one operation associated with the application.

9. An electronic device, comprising a memory; and a processor coupled to the memory and configured by instructions stored in the memory to:

receive owner control information from an owner of the electronic device, the owner control information comprising:

an identification of the owner of the electronic device, the owner being different from the user of the electronic device;

an identification of one or more applications having an installation status on which the owner of the electronic device predicates operation of functions of the electronic device independent of functions of the one or more applications; and one or more permissions associated with the identification of the one or more applications permitted for installation on the electronic device, where:

for a first of the one or more applications, a first of the one or more permissions allows operation of a first function of the electronic device only when the first of the one or more applications is not installed on the electronic device; and for a second of the one or more applications, a second of the one or more permissions allows operation of a second function of the electronic device only when the second of the one or more applications is installed on the electronic device, the second function being a function independent of functions provided by the second of the one or more applications;

store the owner control information in a data store of the electronic device; and control access of the user to the electronic device based upon the owner control information.

10. The electronic device of claim 9, wherein controlling access based upon the owner control information comprises:

determining whether an application not present on the electronic device is permitted for installation on the electronic device based on the owner control information; and installing the application in response to receiving a request to install the application when the application is permitted for installation on the electronic device based on the owner control information.

11. The electronic device of claim 9, wherein the processor controls access based upon the owner control information by determining whether presence of an application on the electronic device is required.

12. The electronic device of claim 11, wherein the processor is further configured to disable at least one operation of the electronic device independent of the application until the application is installed on the electronic device when the application is not present on the electronic device and presence of the application on the electronic device is required, and wherein the processor controls access based upon the owner control information by preventing deletion of the application when the application is present on the electronic device and presence of the application on the electronic device is required.

13. The electronic device of claim 9, wherein the processor controls access based upon the owner control information by determining whether presence of an application on the electronic device is prohibited.

14. The electronic device of claim 13, wherein the processor is further configured to disable at least one operation of the electronic device independent of the application until the application is deleted from the electronic device when the application is present on the electronic device and presence of the application on the electronic device is prohibited, and wherein the processor controls access based upon the owner control information by preventing installation of the application when the application is not present on the electronic device and presence of the application on the electronic device is prohibited.

15. The electronic device of claim 13, wherein the processor controls access based upon the owner control information by automatically deleting the application when the application is present on the electronic device and presence of the application on the electronic device is prohibited.

16. The electronic device of claim 9, wherein the processor controls access based upon the owner control information by restricting at least one operation associated with an application installed on the electronic device.

17. A non-transitory computer-readable medium with instructions stored thereon, wherein the instructions are executable by a processor to cause the processor to perform the operations of:

receiving owner control information from an owner of an electronic device, the owner control information comprising:

an identification of the owner of the electronic device, the owner being different from a user of the electronic device;

an identification of one or more applications having an installation status on which the owner of the electronic device predicates operation of functions of the electronic device independent of functions of the one or more applications; and one or more permissions associated with the identification of the one or more applications permitted for installation on the electronic device, where:

for a first of the one or more applications, a first of the one or more permissions allows operation of a first function of the electronic device only when the first of the one or more applications is not installed on the electronic device; and for a second of the one or more applications, a second of the one or more permissions allows operation of a second function of the electronic device only when the second of the one or more applications is installed on the electronic device, the second function being a function independent of functions provided by the second of the one or more applications;

storing the owner control information in a data store of the electronic device; and controlling access of the user to the electronic device based upon the owner control information.

18. The non-transitory computer-readable medium of claim 17, wherein controlling access based upon the owner control information comprises installing an application identified by the owner control information as a required application.

19. The non-transitory computer-readable medium of claim 17, wherein controlling access to the non-transitory computer-readable medium based upon the owner control information comprises automatically deleting an application identified by the owner control information as an excluded application.

20. The non-transitory computer-readable medium of claim 17, wherein controlling access based upon the owner control information comprises preventing installation of an application identified by the owner control information as an excluded application.

* * * * *